(12) United States Patent
Wexler et al.

(10) Patent No.: US 12,104,749 B2
(45) Date of Patent: Oct. 1, 2024

(54) LINER COLLAPSE MITIGATIONS FOR TYPE IV CONFORMABLE PRESSURE VESSELS

(71) Applicant: Linamar Corporation, Guelph (CA)

(72) Inventors: Jason Wexler, San Francisco, CA (US); Jordan Sanches, San Francisco, CA (US); Vladimir Kovalevsky, Rantigny (FR)

(73) Assignee: Linamar Corporation, Guelph (CA)

( * ) Notice: Subject to any disclaimer, the term of this patent is extended or adjusted under 35 U.S.C. 154(b) by 342 days.

(21) Appl. No.: 17/623,353

(22) PCT Filed: Jun. 29, 2020

(86) PCT No.: PCT/US2020/070211
§ 371 (c)(1),
(2) Date: Dec. 28, 2021

(87) PCT Pub. No.: WO2020/264583
PCT Pub. Date: Dec. 30, 2020

(65) Prior Publication Data
US 2022/0356991 A1    Nov. 10, 2022

Related U.S. Application Data

(60) Provisional application No. 62/868,269, filed on Jun. 28, 2019.

(51) Int. Cl.
*F17C 1/16*    (2006.01)

(52) U.S. Cl.
CPC ........ *F17C 1/16* (2013.01); *F17C 2201/0104* (2013.01); *F17C 2201/056* (2013.01);
(Continued)

(58) Field of Classification Search
CPC ............... F17C 1/16; F17C 2201/0104; F17C 2201/056; F17C 2203/0604; F17C 2203/0631
(Continued)

(56) References Cited

U.S. PATENT DOCUMENTS

| 5,419,139 A | 5/1995 | Blum et al. |
| 2009/0057319 A1 | 3/2009 | Schlag |

(Continued)

FOREIGN PATENT DOCUMENTS

| CA | 3132719 A1 * | 9/2020 | ................ F17C 1/08 |
| JP | H11210988 | 8/1999 | |

(Continued)

*Primary Examiner* — J. Gregory Pickett
*Assistant Examiner* — Niki M Eloshway
(74) *Attorney, Agent, or Firm* — Miller Canfield

(57) ABSTRACT

A type IV pressure vessel has improved permeate gas management. The pressure vessel comprises an inner polymeric liner, a breather layer disposed on the liner, and an outer composite shell structure disposed on the breather layer. The breather layer is gas permeable, impermeable to liquids, and provides a flow passageway for gas permeating through the liner wall collected by the breather layer. The outer composite shell is formed by one or more layers of fiber of a first fiber type and resin. Gas permeating from an interior space of the liner is received by the breather layer and directed to a predetermined exit location on the pressure vessel.

22 Claims, 23 Drawing Sheets

(52) U.S. Cl.
    CPC ............ *F17C 2203/0604* (2013.01); *F17C 2203/0631* (2013.01); *F17C 2203/0636* (2013.01); *F17C 2203/066* (2013.01); *F17C 2203/0663* (2013.01); *F17C 2203/0673* (2013.01); *F17C 2205/0305* (2013.01); *F17C 2221/014* (2013.01); *F17C 2221/017* (2013.01); *F17C 2221/033* (2013.01); *F17C 2221/035* (2013.01); *F17C 2270/0168* (2013.01)

(58) Field of Classification Search
    USPC ........................................... 220/590
    See application file for complete search history.

(56) References Cited

U.S. PATENT DOCUMENTS

| | | |
|---|---|---|
| 2010/0075200 A1 | 3/2010 | Hatta |
| 2013/0341235 A1 | 12/2013 | Leavitt |
| 2015/0274006 A1 | 10/2015 | Chung |
| 2018/0172207 A1 | 6/2018 | Uehara et al. |
| 2018/0363853 A1* | 12/2018 | Newhouse ............... F17C 1/06 |

FOREIGN PATENT DOCUMENTS

| | | |
|---|---|---|
| WO | 9412396 | 6/1994 |
| WO | 2017200713 | 11/2017 |

\* cited by examiner

LINER COLLAPSE MITIGATIONS FOR TYPE IV CONFORMABLE PRESSURE VESSELS

CROSS-REFERENCE TO RELATED APPLICATIONS

This application claims priority to U.S. Provisional Application No. 62/868,269, filed on Jun. 28, 2019.

BACKGROUND OF THE INVENTION

1. Field of the Invention

The present invention relates to Type IV pressure vessels. More specifically, the present invention relates to pressure vessels for storing fluids and/or gases under pressure, such as, natural gas, oxygen, nitrogen, hydrogen, propane, and the like. The Type IV pressure vessels or tanks have a metal-free construction comprising a carbon fiber or composite wound and/or braided over a thermoplastic polymeric liner.

2. Description of Related Art

Type IV pressure vessels for storage of compressed gas comprising polymeric liners and fiber reinforced composite shell structures have been used as reliable, highly efficient vessels. These vessels have advantages over other vessel designs based on weight efficiency, corrosion resistance, and fatigue performance. Polymers are more susceptible to permeation of gases than metallic tanks/liners. Because of permeation, gas migrates through the material from high pressure areas to low pressure areas. This migration may cause accumulation of gas in a gap between the polymeric liner and the composite shell structure. Accumulation of gas in this region can result in at least one of these phenomena: (1) induced buckling of the liner inward as the pressure between the liner and the composite shell exceeds the internal pressure of the pressure vessel when the pressure vessel is depressurized, and (2) the trapped gas between the polymeric liner and the composite shell as the pressure vessel is repressurized can prevent a proper fill or be pushed out of the pressure vessel structure, sometimes referred to as a "dynamic gas release".

A first known method of managing permeation of gas from a pressure vessel is disclosed in U.S. Pat. No. 10,168,002, wherein a pressure vessel is formed by wrapping an inner composite structure about a polymeric liner, an inner polymeric layer is applied about the inner composite structure, a porous layer is wrapped about the inner polymeric layer, an outer polymeric layer is applied about the porous layer, and an outer composite shell is wrapped about the outer polymeric layer. Each of the inner composite structure, the porous layer, the inner polymeric layer, the outer polymeric layer, and the outer composite shell are formed by a single set of continuous wrapped fibers forming overlapping helical patterns.

However, the first known method is less desirable when the pressure vessel is an elongated conformable pressure vessel. A first example of an elongated conformable pressure vessel is disclosed in U.S. publication 2016/363265. This exemplary elongated conformable pressure vessel includes an elongated polymeric liner having a plurality of elongated rigid tubing portions with each pair of rigid tubing portions fluidically coupled by a flexible connector portion. Each flexible connector portion optionally includes corrugated sections. In addition, the elongated rigid tubing portions generally have a larger minimum outer diameter than a maximum outer diameter of the flexible connector portions. A second type of conformable pressure vessel, disclosed in U.S. Pat. No. 9,217,538, includes an elongated tube that is wrapped in a spiral to form a spiral tank. While specific dimensions and configurations of conformable pressure vessels may vary, conformable pressure vessels generally have elongated liners that have greater liner sidewall lengths than typical lengths of cylindrical non-conformable pressure vessels for a specific diameter of liner. Further, conformable pressure vessels are typically wrapped and/or folded into a predefined space prior to curing the resin. As such, the sidewall length of the liner is generally longer than outer dimensions of the predefined space of the manufactured pressure vessel. The increased sidewall length of the liner for the conformable pressure vessel in comparison to the overall dimensions of the predefined space for the manufactured pressure vessel presents challenges when managing gas permeation.

The first known method requires each of at least the porous layer, the inner polymeric layer, the outer polymeric layer, and the composite shell being formed by a single set of continuous wrapped fibers forming overlapping helical patterns. For certain pressure vessels, and in particular elongated conformable pressure vessels, forming each of a plurality of layers by wrapping a single set of continuous wrapped fibers in overlapping helical patterns is less desirable than braiding a plurality of fiber strands around the liner. Braiding a plurality of fibers around the liner, as disclosed in U.S. publication 2016/363265, is preferable to wrapping fibers in overlapping helical patterns since the braiding of fibers can accommodate the various diameters and tapered sections of the liner for certain conformable pressure vessels.

Further, the first known method requires an inner composite structure in direct contact with an outer surface of the liner. Applying an inner composite structure in direct contact with the liner can entrap air bubbles along the liner outer surface, particularly if the liner includes corrugated flexible connector portions. For certain pressure vessels, and in particular elongated conformable pressures vessels having corrugated connector portions, disposing an inner composite structure directly onto the pressure vessel liner is less desirable since the resin may partially and unevenly fill the corrugated spaces of the flexible connector portions. As such, an alternative method of managing permeate gas is desired for elongated conformable pressure vessels which does not require inclusion of a porous layer, an inner polymeric layer, an outer polymeric layer, and a composite shell with each of the porous layer, the inner polymeric layer, the outer polymeric layer and the composite shell formed from a single set of continuous wrapped fibers in overlapping helical patterns. Further, an alternative method of managing permeate gas is desired that does not require an inner composite structure applied directly on the polymeric liner.

A second known method of managing permeation of gas from a pressure vessel is disclosed in U.S. Pat. No. 10,415,753, wherein a pressure vessel generally comprises a polymeric liner covered with a gas ventilation layer (i.e., "breather layer") and an outer composite shell structure. The pressure vessel includes a stem configured to cause gas to flow in and out of the liner. A gas discharge port is formed between the stem and the outer composite shell of the pressure vessel so that gas permeated from the liner to the outer layers is discharged into atmosphere through the gas discharge port. The gas discharge port is formed by a gap between an outer diameter of the stem and an inner diameter of an opening in the outer composite shell.

Further, the second known method discloses the breather layer being formed by winding a fiber material not impregnated with resin onto the liner with a first winding density. The outer composite shell is formed of a fiber material impregnated with resin wound onto an outer periphery of the breather layer with a second winding density. The second method defines the winding density as number of windings of the fiber material wound per unit surface area in a winding target area and requires the first winding density being lower than the second winding density. In addition, the second known method requires both the breather layer and the outer composite shell being formed of a single type of fiber material.

However, for certain pressure vessels, particularly elongated conformable pressure vessels, it is desirable to braid a plurality of strands of fiber around the liner instead of winding a strand of fiber around the liner in a helical pattern since braided strands of fiber more easily conform to varying diameters of the liner for certain conformable pressure vessels. The braided strands of fibers do not have a winding density per se since the fibers are not wound around the liner in a helical pattern. This is further complicated by liners that include varying outer diameters. For a given number of strands of fibers that are braided around a liner, the fiber density per unit of liner surface area is dependent on the number of fibers in each strand, the number of strands in the braid pattern, and the outer diameter of the liner. As such, as the outer diameter of the liner increases, the fiber density per unit surface area will decrease for a specific number of strands of fibers.

Also, using the same fiber material in both breather layer and the outer composite shell, as required by the second known method, is less desirable for certain pressure vessels than using different fiber materials for each of the breather layer and the outer composite structure. Some types of fiber, such as carbon fiber as an example, are commonly used as part of the outer composite shell. Other types of fibers may have a lower cost and/or a lower weight than carbon fiber. Further, it is desirable to optionally select a different fiber material for a breather layer than for an outer composite shell for certain applications based on fiber properties, fiber outer diameters, gas permeability of the fibers, porosity of the braided fiber layer, and/or desired performance properties.

It is desirable, therefore, to provide a method of managing gas permeation from a type IV elongated conformable pressure vessel by improving the porosity of the breather layer over the porosity of a helically wrapped dry fiber layer of the same fiber as used for the outer composite shell. Further, it is desirable to provide a method of managing gas permeation for conformable pressure vessels having larger outer diameter sections spaced apart by smaller outer diameter sections. It is also desirable to prevent intrusion of liquid resin into the breather layer during the manufacturing processes. Finally, it is desirable to incorporate a breather layer that is gas permeable and liquid impermeable.

SUMMARY OF THE INVENTION

A type IV conformable pressure vessel is provided comprising an inner polymeric liner, a breather layer disposed on the liner, and an outer composite shell structure disposed on the breather layer. The breather layer is gas permeable, impermeable to liquids, and provides a flow passageway for gas permeating through the liner wall collected by the breather layer. The outer composite shell is formed by one or more layers of fiber of a first fiber type and resin. Gas permeating from an interior space of the liner is received by the breather layer and directed to a predetermined exit location on the pressure vessel.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
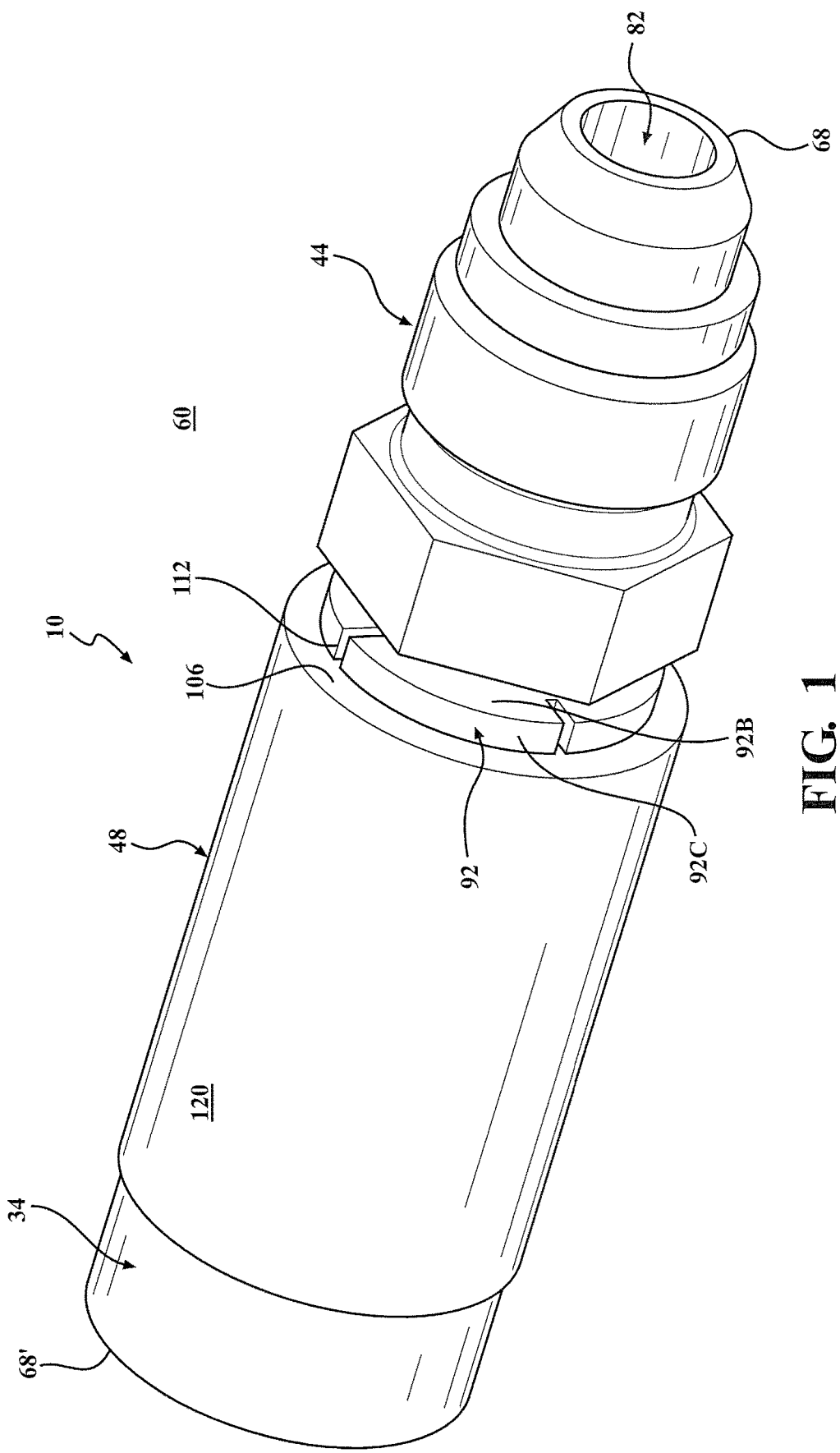
FIG. 1 is a perspective view of a portion of a pressure vessel having a stem with vent slots, according to one embodiment of the present invention.
Figure 2:
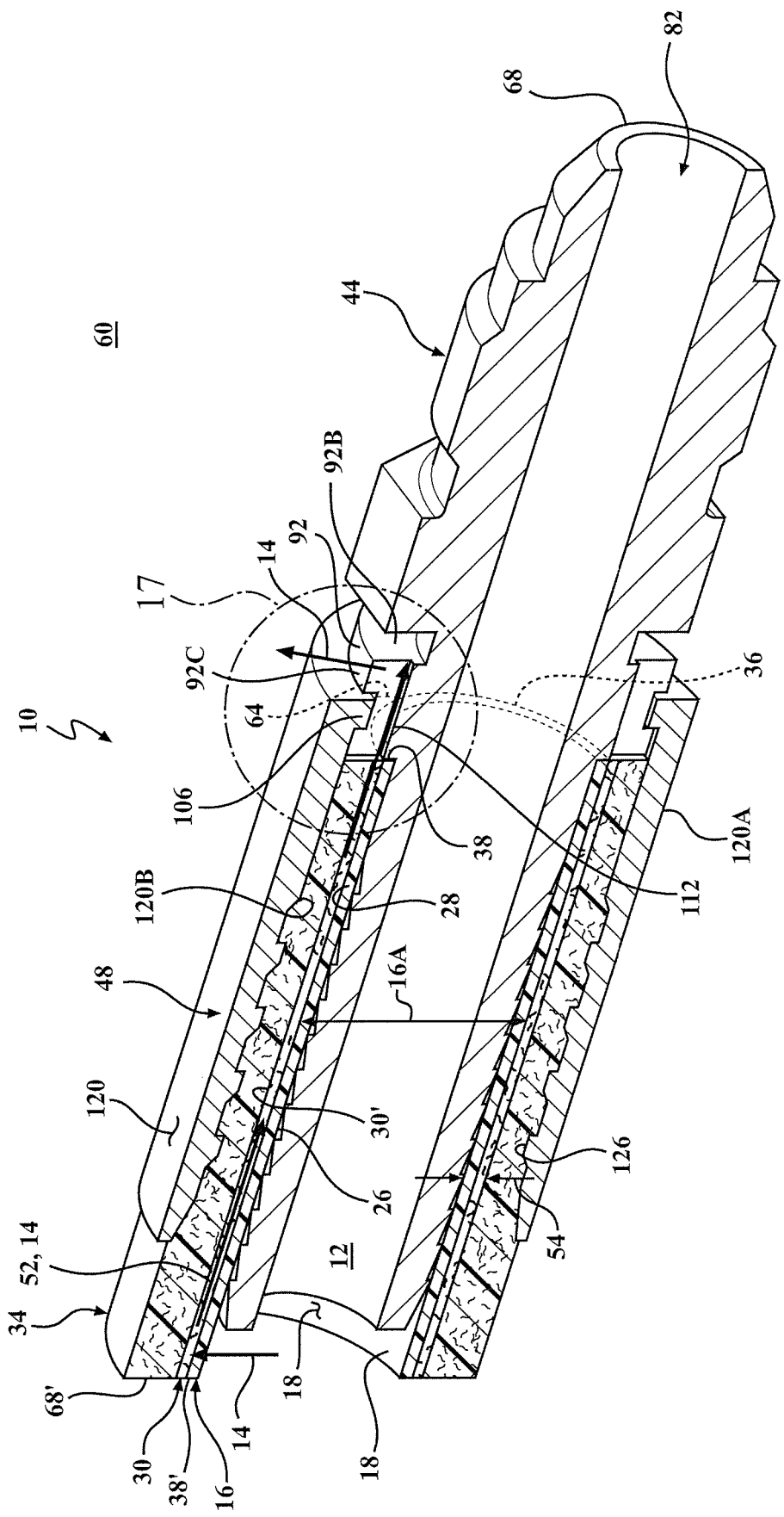
FIG. 2 is a cross-sectional view of an embodiment of the pressure vessel of FIG. 1, illustrating a breather layer between an inner liner and an outer composite shell.

Referring to the Figures, wherein like numerals indicate like or corresponding parts throughout the several views, a type IV pressure vessel 10 for containing liquids and/or gases 12 under pressure and having improved management of permeation gas 14 is shown in FIGS. 1 and 2, according to one embodiment of the present invention. The pressure vessel 10 includes a polymeric liner 16 comprising an interior hollow body or space 18 defined by an elongated cylindrical wall 26. An outer surface 28 of the cylindrical wall 26 is covered by at least a breather layer 30 and an outer composite shell structure 34, as shown in FIG. 2. The liner 16 includes at least one inlet opening 36 at a first terminal end 38 of the liner 16 through which a stem 44 is inserted for adding and removing gas 12 from the interior hollow body 18 of the liner 16. In addition, a ferrule 48 fixedly couples the outer composite shell 34 to the stem 44.

The pressure vessel 10 is suitable for storage of compressed liquids and/or gases 12, such as nitrogen, hydrogen, natural gas, helium, dimethyl ether, liquefied petroleum gas, xenon, and the like. A pressure vessel 10 for storage of hydrogen for automotive applications typically is designed for about 5,000 PSI to about 10,000 PSI of nominal working pressure. In comparison, pressure vessels 10 for storage of compressed natural gas are typically designed for about 3,000 PSI of internal pressure during normal use.

Referring to FIG. 2, the breather layer 30 provides an escape path 52 for gas 14 that permeates through the cylindrical wall 26 of the liner 16. The breather layer 30 comprises a porous material 30 installed between the liner 16 and the outer composite shell 34 that can be used to drain gas 14 from a gap 54 between the liner 16 and the outer composite shell 34, along the length of the pressure vessel 10 to an external atmosphere 60 through an opening 64 near the stem 44 located at one end 68 of the pressure vessel 10. This results in the lower gap 54 pressure at steady state and significantly reduces the amount of gas 14 absorbed in the outer composite shell 34 and the liner 16.

Referring to FIG. 2, conformable pressure vessels 10 tend to have longer overall length of the liner 16 per unit of liner outer diameter 16A than typical non-conformable pressure vessels 10. The overall length of the liner 16 is measured along the outer surface 28 of the cylindrical wall 26 from the first terminal end 38 of the liner 16 to an opposing terminal end 38' of the liner 16. The overall length of a liner 16 for a typical pressure vessel 10 is about the same as a linear distance between one end 68 and an opposing end 68' of the pressure vessel 10. However, conformable pressure vessels 10 can have a liner 16 that has an overall liner length that is many times greater than a linear distance between one end 68 and an opposing end 68' of the conformable pressure vessel 10. During the manufacturing of a conformable pressure vessel 10, the liner 16 is covered with at least the outer composite shell 34 and folded and/or spirally wrapped to fill a predefined space prior to curing resin 72 in the outer composite shell 34. Thus, the overall exterior dimensions of the conformable pressure vessel 10 are generally determined by the predefined space with the overall length of the liner 16 being greater than the length, the width, and/or the height of the predefined space defining the pressure vessel 10 exterior dimensions. The overall length of the liner 16 for a conformable pressure vessel 10 is a challenge for gas flow 52 to vent the permeate gas 14 to atmosphere 60 since the liner 16 is significantly longer than the overall exterior dimensions of the conformable pressure vessel 10.

Various embodiments of breather layers 30 with improved permeate gas 14 management, as well as improvements in venting the breather layers 30 to an external atmosphere 60, are shown in FIGS. 1, 2, and 5-23. Each of the disclosed embodiments includes at least a polymeric liner 16, a breather layer 30, an outer composite shell 34 of fiber and resin, a stem 44, and a ferrule 48, as illustrated in FIG. 2.

The polymeric liner 16, shown in FIG. 2, is generally formed from one or more polymeric materials such as Nylon (PA), ethylene-vinyl acetate (EVA), linear low-density polyethylene (LLDPE), low-density polyethylene (LDPE), high-density polyethylene (HDPE), polypropylene (PP), ethylene vinyl alcohol (EVOH), polytetrafluoroethylene (PTFE), polyurethane (PU), and/or polyvinyl chloride (PVC). The polymeric liner 16 may be formed of a single layer of polymeric material or may comprise a multi-layered structure of two or more polymeric layers and further may include one or more non-structural metal film layers and/or non-structural metal foil, as desired for specific applications.

Figure 3A:
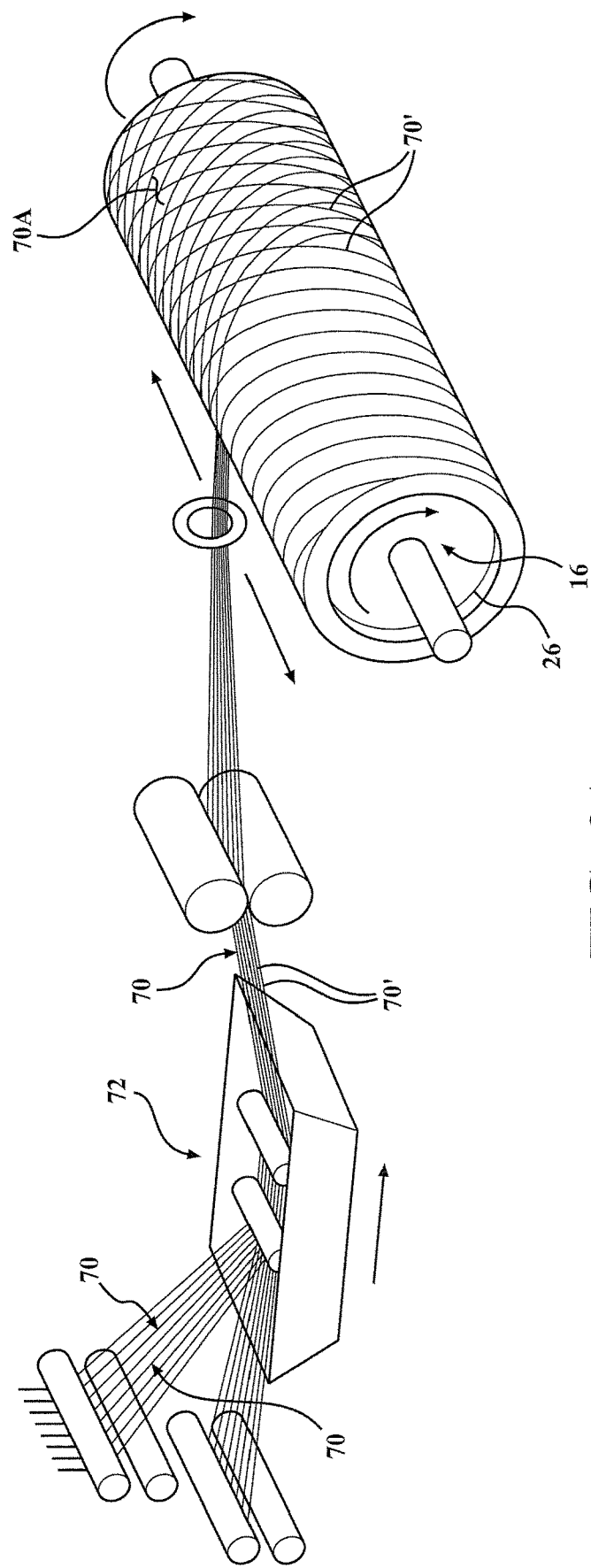
FIG. 3A illustrates a known method of wrapping a strand of resin impregnated fibers around a liner in a helical pattern.
Figure 4:
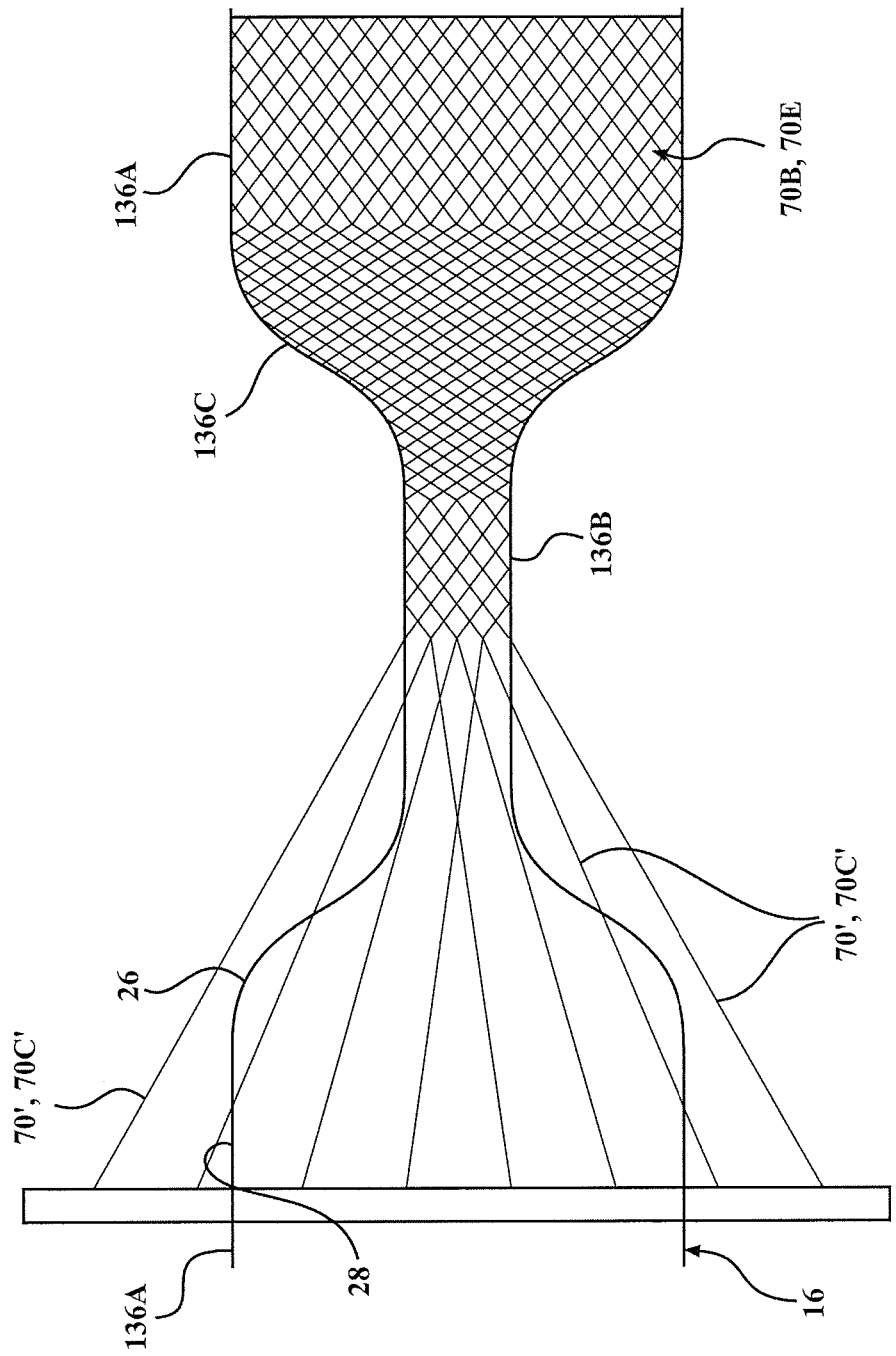
FIG. 4 illustrates a method of braiding a plurality of strands of fibers around a liner having a larger outer diameter portion, a tapered diameter portion, and a smaller outer diameter portion.

The outer composite shell 34 of the pressure vessel 10, shown in FIG. 2, is generally formed by disposing resin impregnated fibers 70 onto the liner 16, as illustrated in FIGS. 3A and 4. A plurality of fiber filaments 70 is grouped to form a strand 70' of fiber 70. Fiber strands 70' can be applied to the liner 16 by continuous wrapping one or more strands 70' of fibers 70 around the liner 16 in overlapping helical patterns to form one or more layers of wrapped fiber 70A, as illustrated in FIG. 3A. The fiber strands 70' can be coated with liquid resin 72 prior to being wrapped on the liner 16, as shown in FIG. 3A. Alternatively, the fiber strands 70' can be coated with liquid resin 72 after being wrapped on the liner 16 and/or the fiber 70 can be pre-impregnated with resin 72. Alternatively a plurality of fiber strands 70' can be braided around the liner 16 to form a braided layer 70B of fiber 70, as illustrated in FIG. 4. Further, the fiber strands 70' can be impregnated with liquid resin 72 prior to and/or after braiding the fibers strands 70' around the liner 16.

The outer composite shell 34 shown in FIG. 2 includes one or more layers 70A, 70B, of fiber 70 coated in resin 72. Suitable fibers 70 for the outer composite shell 34 include one or more of carbon fiber, glass fiber, basalt fiber, boron fiber, aramid fiber, high-density polyethylene fiber (HDPE), Zylon™ poly(p-phenylene-2,6-benzobisoxazole fiber (PBO), aramid fiber, Kevlar® poly-paraphenylene terephthalamide fiber, polyethylene terephthalate fiber (PET), Nylon fiber (PA), polyethylene naphthalate (PEN), polyester fiber (PL), polypropylene fiber (PP), and polyethylene fiber (PE), and the like. A plurality of fiber filaments 70 are grouped to form a strand 70' of fibers 70 prior to being disposed onto the liner 16. The fiber filaments 70 are defined by at least a material composition and a fiber outer diameter. Suitable resins 72 include one or more of epoxy resin, vinylester resin, thermoplastic resin, polyester resin, urethane, and the like. The selection of materials and dimensions for the liner 16, as well as the type and amount of resin 72 and fiber 70 forming the outer composite shell 34, are selected based in part on the desired operating conditions of the pressure vessel 10.

Figure 5:
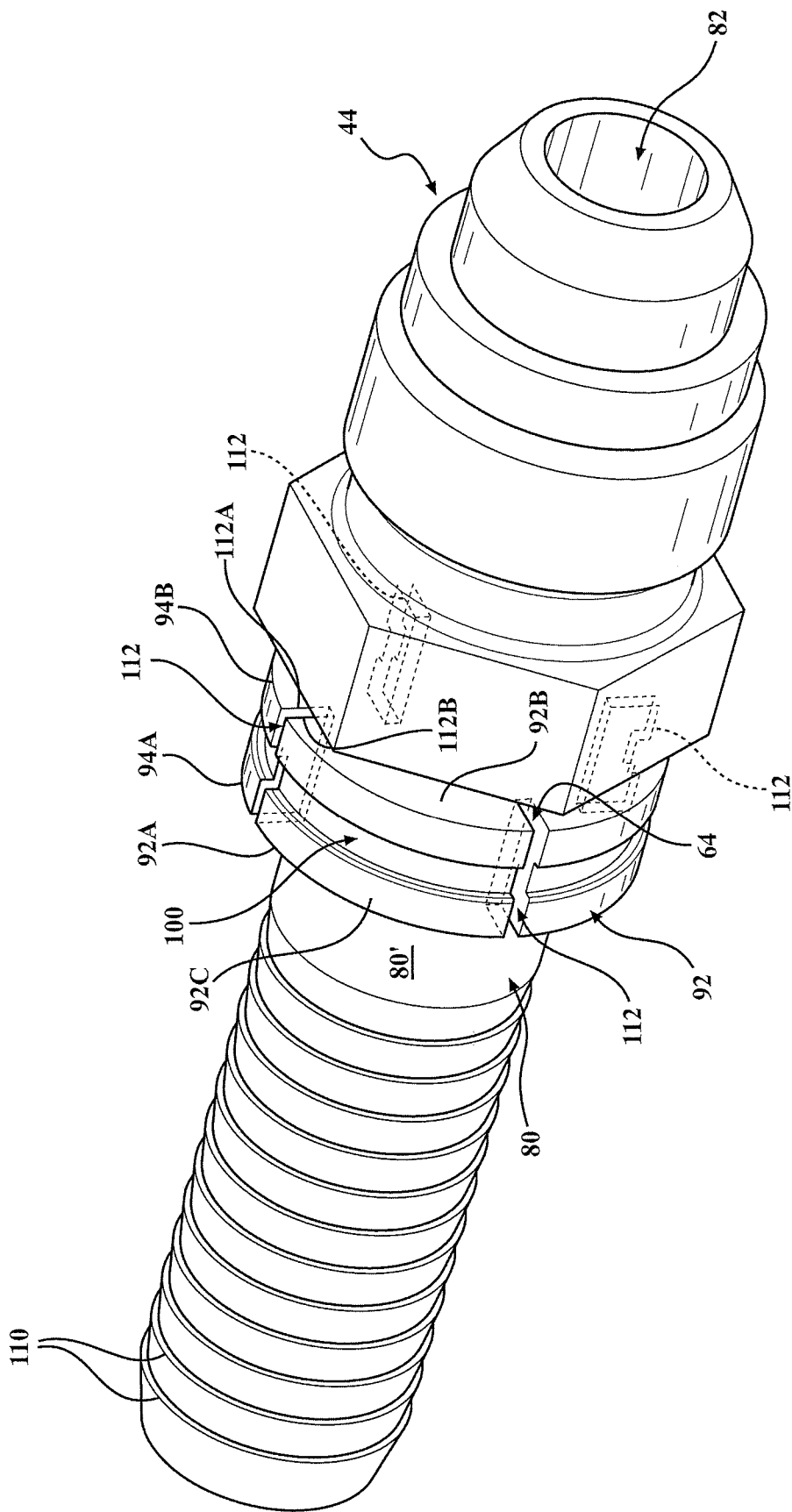
FIG. 5 is a perspective view of the stem of FIG. 1, illustrating vent slots extending through a mounting ridge of the stem.

FIG. 5 illustrates one embodiment of the stem 44 prior to assembly with the liner 16. The stem 44 comprises a cylindrical boss 80 having a passageway 82 extending longitudinally through the cylindrical boss 80 through which gas 12 is inserted and removed from the interior space 18 of the liner 16. The cylindrical boss 80 is configured to be inserted into the inlet opening 36 in the liner 16, as shown in FIG. 2.

Referring to FIG. 5, the stem 44 includes a mounting ridge 92 that projects radially away from the cylindrical boss 80 and extends circumferentially around an outer peripheral surface 80' of the stem 44. The mounting ridge 92 includes a generally vertical liner mounting surface 92A spaced apart from an opposing generally vertical mounting surface 92B with an outer periphery surface 92C extending between a distal end 94A of the liner mounting surface 92A and a distal end 94B of the opposing mounting surface 92B, as illustrated in FIG. 2.

A channel 100 extends circumferentially around the outer periphery surface 92C of the mounting ridge 92, as shown in FIGS. 2 and 5. The channel 100 is configured to matingly engage with a lip 106 extending circumferentially around an inner surface 120B of the ferrule 48, as shown in FIG. 2.

The exterior surface 80' of the cylindrical boss 80 optionally includes retention features 110 such as angled teeth or ribs 110 projecting radially away from the exterior surface 80', as shown in FIG. 5.

A plurality of spaced apart vent slots 112, as shown in the embodiment of FIG. 5, extend through the mounting ridge 92 between the liner mounting surface 92A and the opposing mounting surface 92B. The vent slots 112 comprise spaced apart opposing side walls 112A, 112B. Any number and configuration of vent slots 112, including axial holes, may be included in the stem 44 as desired for specific applications.

Referring to FIG. 2, the ferrule 48 fixedly couples the outer composite shell 34 to the stem 44. The ferrule 48 comprises a generally cylindrical hollow tube 120 having an outer surface 120A and an opposing inner surface 120B extending in a longitudinal direction. One embodiment of the ferrule 48, shown in FIG. 2, includes tooth-like projections 126 extending radially away from the inner surface 120B of the ferrule 48 configured to frictionally engage with the outer composite shell 34 of the pressure vessel 10. Also shown in FIG. 2, the ferrule 48 includes a lip 106 projecting radially inward from the inner surface 120B of the ferrule 48 and configured to matingly engage with the channel 100 in the mounting ridge 92 of the stem 44. Alternatively, the lip 106 of the ferrule 48 and/or the tooth-like projections 126 are formed during a crimping process to mechanically fasten the ferrule 48 to the outer composite shell 34 and to the stem 44.

Figure 6:
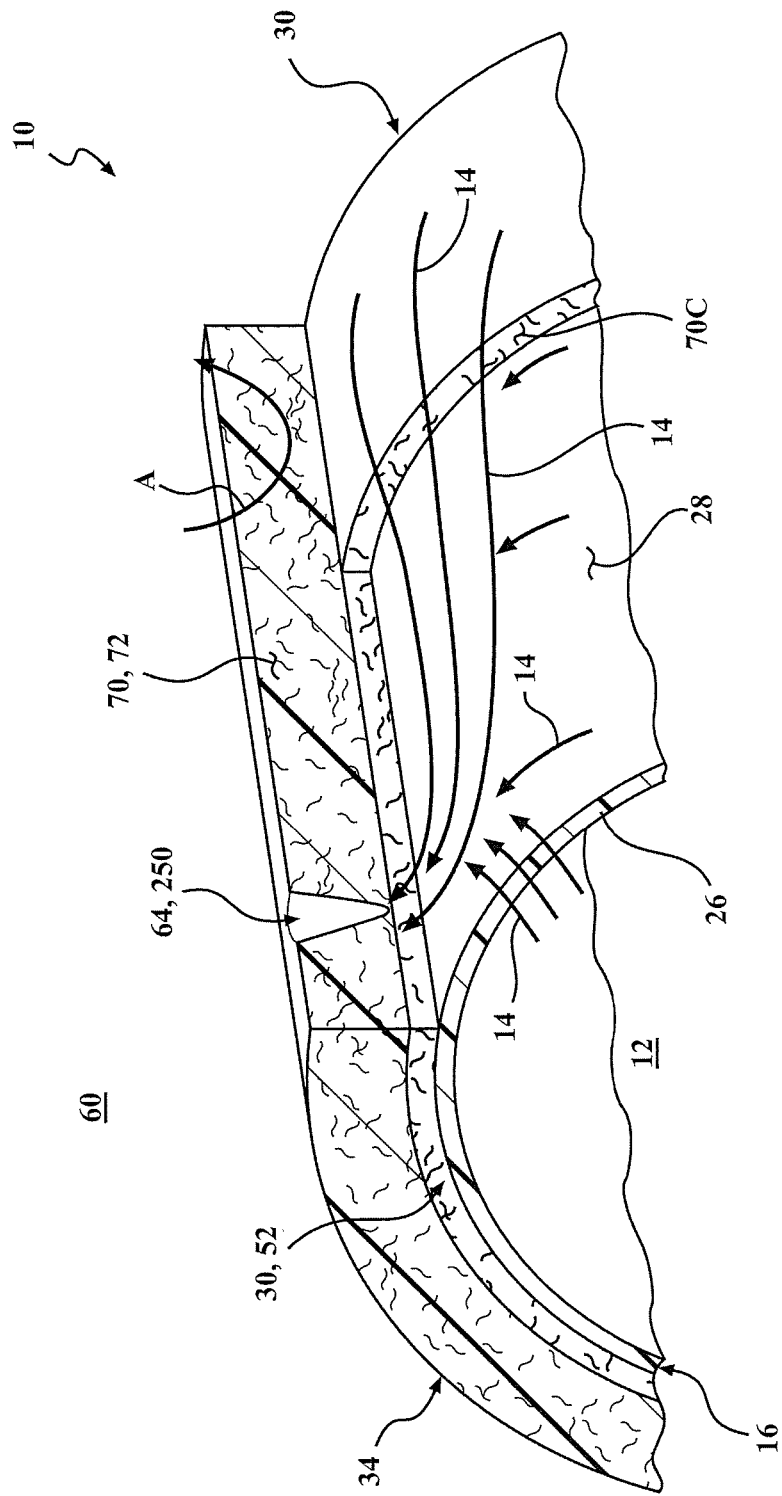
FIG. 6 is a cutaway view of a portion of the pressure vessel of FIG. 2, illustrating gas flow through the liner, into the breather layer, through the breather layer, and exhausted through a predetermined exit location to atmosphere.

The breather layer 30 surrounds the outer periphery 28 of the cylindrical wall 26 and extends between the first terminal end 38 and the second terminal end 38' of the liner 16, as shown in FIG. 2. FIG. 6 shows a cut-away view of the pressure vessel 10 of FIG. 2 illustrating gas 14 permeating through the liner 16 and into the breather layer 30. The breather layer 30 is gas permeable and provides a pathway 52 for gas 14 permeating through the liner 16. Gas 14 collected by the breather layer 30 is directed towards a predetermined exit location 64 on the pressure vessel 10. In the embodiment shown in FIG. 6, the breather layer 30 is also liquid impervious, as represented by arrow A. Thus, liquid resin 72 applied to the fibers 70 of the outer composite shell 34 will not be absorbed by the breather layer 30. Preventing absorption of resin 72 within the breather layer 30, and particularly preventing resin 72 intrusion between the breather layer 30 and the liner 16, maintains gas permeability of the breather layer 30.

Figure 3B:
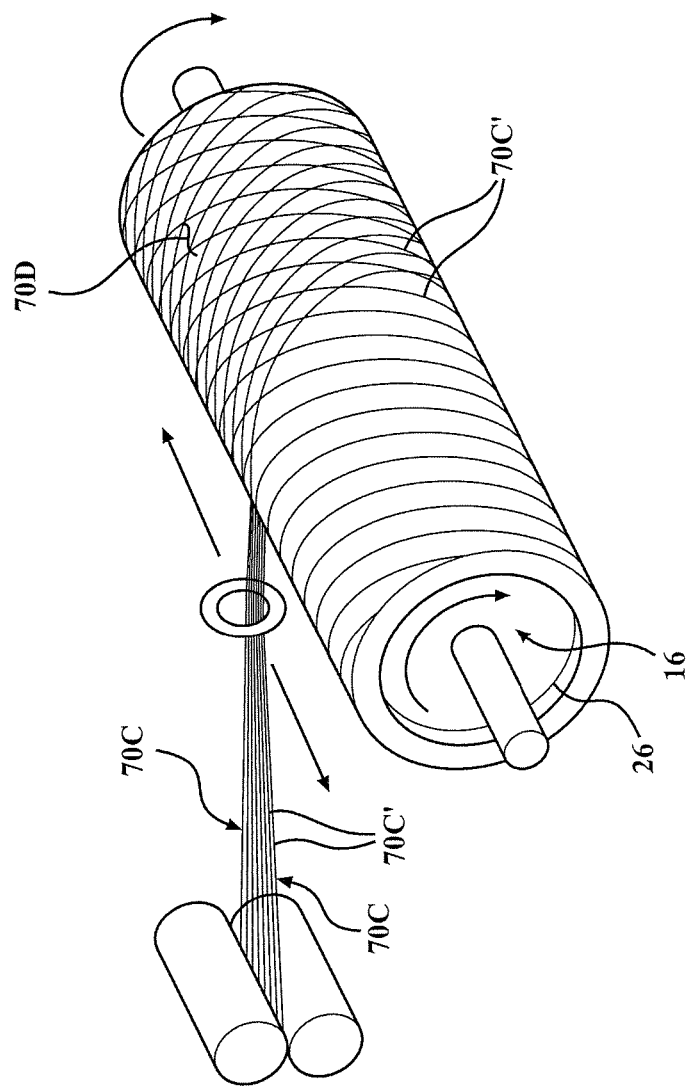
FIG. 3B illustrates a method of wrapping a strand of dry fibers around a liner in a helical pattern according to one embodiment of the present invention.

One embodiment of the breather layer 30, shown in FIG. 6, comprises dry fiber 70C that has increased porosity over the fiber 70 forming the outer composite shell 34. Dry fiber 70C is fiber 70C that is not impregnated with resin 72. The breather layer 30 can be formed by wrapping one or more layers 70D of dry fiber strands 70C' around the cylindrical wall 26 in overlapping helical patterns. An exemplary method of wrapping fiber strands 70C' around a liner 16 is shown in FIG. 3B. Preferably, a plurality of dry fiber strands 70C' are braided around the cylindrical wall 26 for elongated liners 16 to form a braided dry fiber layer 70E. An exemplary process of braiding fiber strands 70', 70C' around a liner 16 is illustrated in FIG. 4. Braiding a plurality of dry fiber strands 70C' around the liner 16 allows the breather layer 30 to closely adhere to the outer surface 28 of the cylindrical wall 26 even when the liner 16 includes larger outer diameter sections 136A, smaller outer diameter sections 136B, and tapered sections 136C between the larger and smaller outer diameter sections 136A, 136B, as illustrated in FIG. 4. The breather layer 30 can include one or more layers 70E of dry fiber 70C.

Figure 7B:
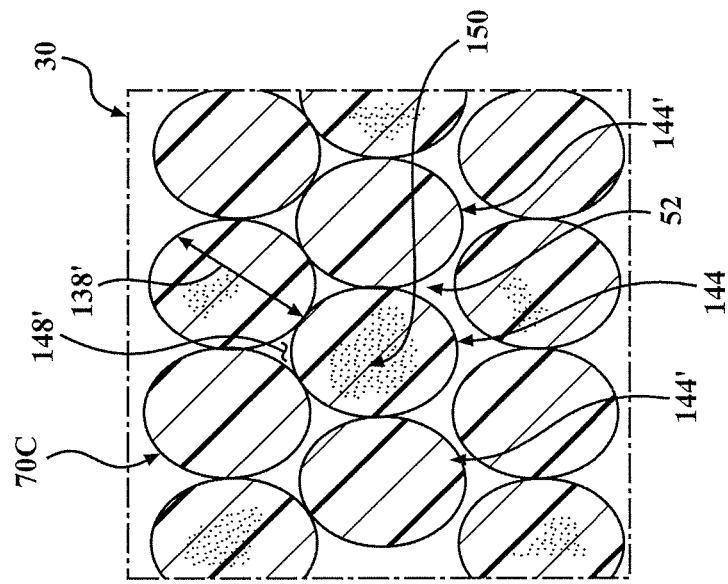
FIGS. 7A and 7B illustrate porosity within a layer of fibers for larger diameter fibers and smaller diameter fibers, respectively.
Figure 7A:
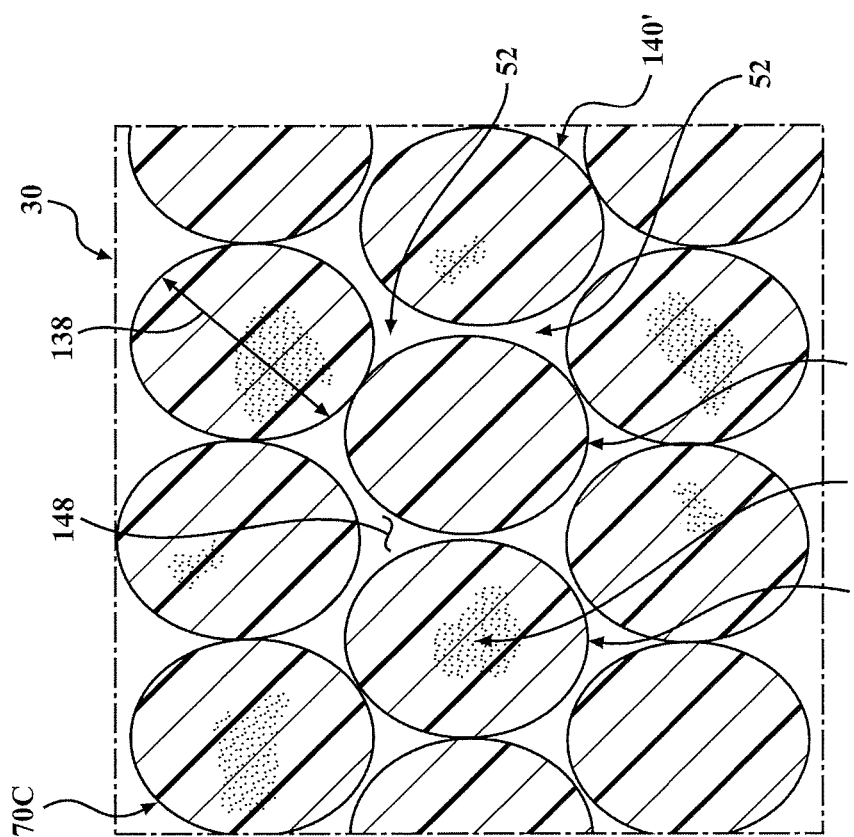

The porosity of the breather layer 30 is related to the outer diameter 138, 138' of the dry fibers 70C, as illustrated in FIGS. 7A and 7B. FIGS. 7A and 7B show cross-sectional views of a grouping of fibers 140, 140' having larger outer diameters 138 and fibers 144, 144' having smaller outer diameters 138' respectively, of fiber type 70C. Empty space 148 between adjacent larger diameter fibers 140, 140' is larger in FIG. 7A than empty space 148' between adjacent smaller diameter fibers 144, 144' in FIG. 7B. The porosity of the breather layer 30 is directly related to the amount of empty space 148, 148' between adjacent fibers 140, 140', 144, 144' since the empty space 148, 148' forms air channels 52 through the breather layer 30. Thus, the porosity of the breather layer 30 can be increased by selecting fibers 70C having larger outer diameters 138 than the outer diameter of fibers 70 incorporated into the outer composite shell 34.

For example, using glass fiber to form the breather layer 30 will improve the porosity of the breather layer 30 over carbon fiber if the outer diameter 138 of the glass fiber is larger than the outer diameter of the carbon fiber. Glass fiber is typically available in a range of about 3 µm to about 20 µm. In comparison, carbon fiber is typically available in a range of about 5 µm to about 10 µm. Thus, glass fiber having a diameter of about 18 µm would result in greater empty space 148, 148' in the breather layer 30 than if carbon fiber having a diameter of about 7 µm was used to form the breather layer 30, as a non-limiting example.

In addition, selecting a fiber 70C having a non-circular cross-section can increase the empty space 148, 148' in the breather layer 30 over a breather layer 30 comprising fibers 70C with a circular cross-section. While circular and non-circular fibers 70C are suitable for use in the breather layer 30, non-circular fibers 70C are preferred as higher porosities can be achieved than with circular fibers 70C. Optionally, fibers 70C originally aligned in a strand 70C' can be mixed with an air nozzle immediately before a braiding process to increase the porosity within the fiber strand 70C'.

The breather layer 30 can include a plurality of layers of braided and/or wrapped dry fiber strands 70C' as desired for a specific application. Suitable fibers 70C for the breather layer 30 include one or more of carbon fiber, glass fiber, basalt fiber, boron fiber, aramid fiber, high-density polyethylene fiber (HDPE), Zylon™ poly(p-phenylene-2,6-benzobisoxazole fiber (PBO), aramid fiber, Kevlar® poly-paraphenylene terephthalamide fiber, polyethylene terephthalate fiber (PET), polyethylene naphthalate (PEN), Nylon fiber (PA), polyester fiber (PL), polypropylene fiber (PP), polyethylene fiber (PE), and the like. These fibers 70C are available in a range of fiber diameters, fiber shapes, transverse compressive strength, various material compositions, cost, and weight. Selection of a fiber type 70C for the breather layer 30 is based in part, on the gas management requirements for the pressure vessel 10, material cost, material properties, thickness of the fiber layer, and the like. Preferably the selected fiber 70C of the breather layer 30 is different than the selected fiber 70 for the outer composite shell 34 in one or more of material composition, cross-sectional shape, and/or the outer diameter 138 of the fiber 70C. Selecting a fiber 70C for the breather layer 30 having a larger diameter than fiber 70 selected for the outer composite shell 34 will improve the porosity of the breather layer 30 over using the same fiber 70 for both the breather layer 30 and the outer composite shell 34.

Figure 8:
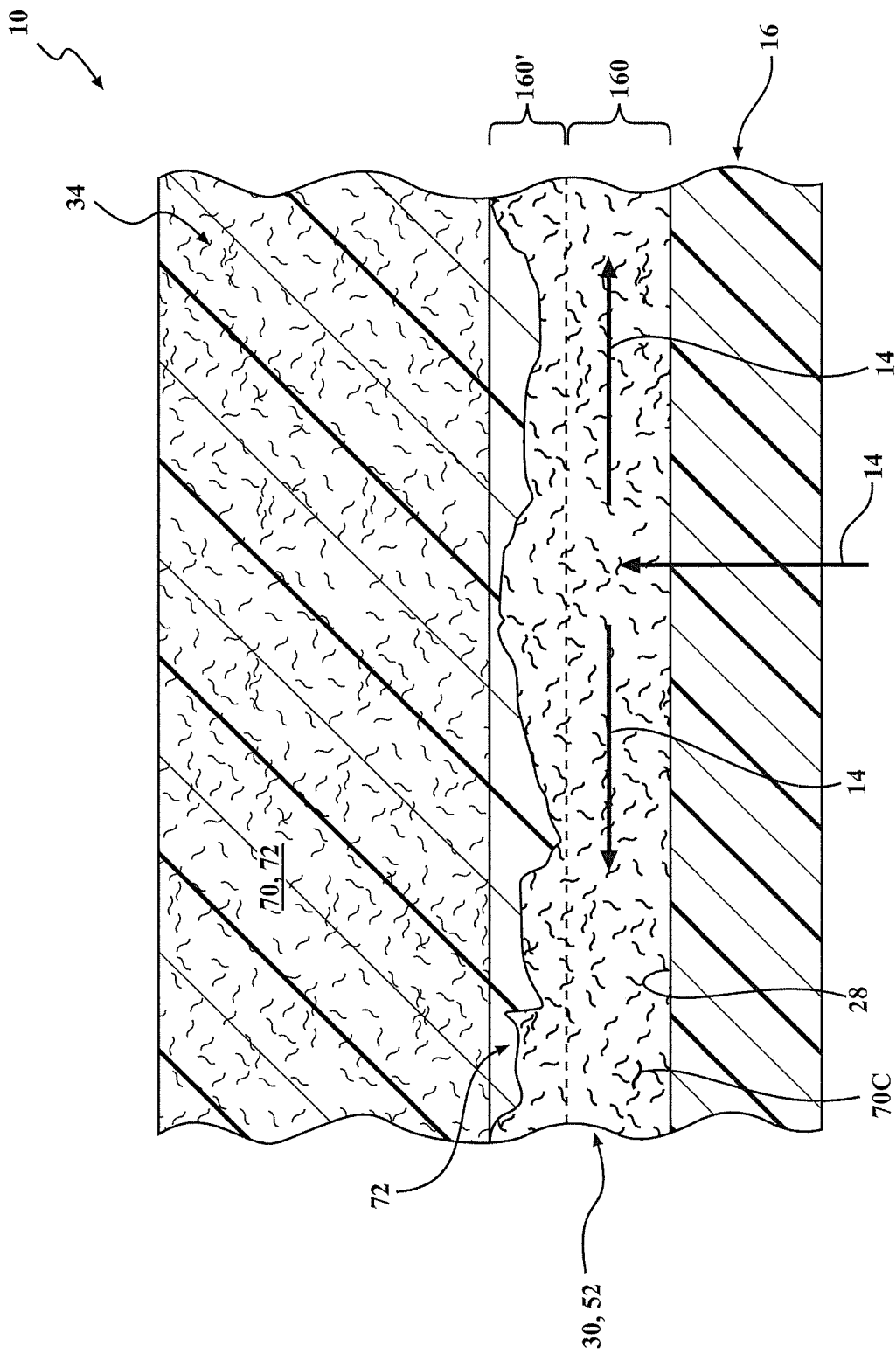
FIG. 8 is an enlarged cross-sectional view of another embodiment of the pressure vessel of FIG. 1, illustrating an inner liner, a breather layer of a first fiber type, and an outer composite shell formed of resin and a second type of fiber.

FIG. 8 shows a cross-sectional view of the pressure vessel 10 having a breather layer 30 formed of dry fiber 70C between the liner 16 and the outer composite shell 34. At least a portion of the radial thickness 160 of the breather layer 30 is free of resin 72 along the outer surface 28 of the liner 16 in order to assure gas 14 flows through the breather layer 30.

Referring to FIG. 8, intrusion of liquid resin 72 into the breather layer 30 must be controlled when the breather layer 30 comprises one or more layers of dry fiber 70C applied to the liner 16. One method to restrict intrusion of liquid resin 72 into the breather layer 30 is to include one or more sacrificial layers 160' of the breather layer 30 prior to applying the outer composite 34, formed by the fiber 70 and resin 72, to the liner 16. The sacrificial layer(s) 160' absorbs the excess liquid resin 72 from the outer composite shell 34 and prevents the intrusion of liquid resin 72 in interior fiber layers 160 adjacent to the liner 16. It is preferable to include additional layers of the breather fiber 70C to form the sacrificial layer 160' if the fiber 70C of the breather layer 30 is of a lower cost and/or lower weight than the fiber 70 of the composite 34.

Figure 9:
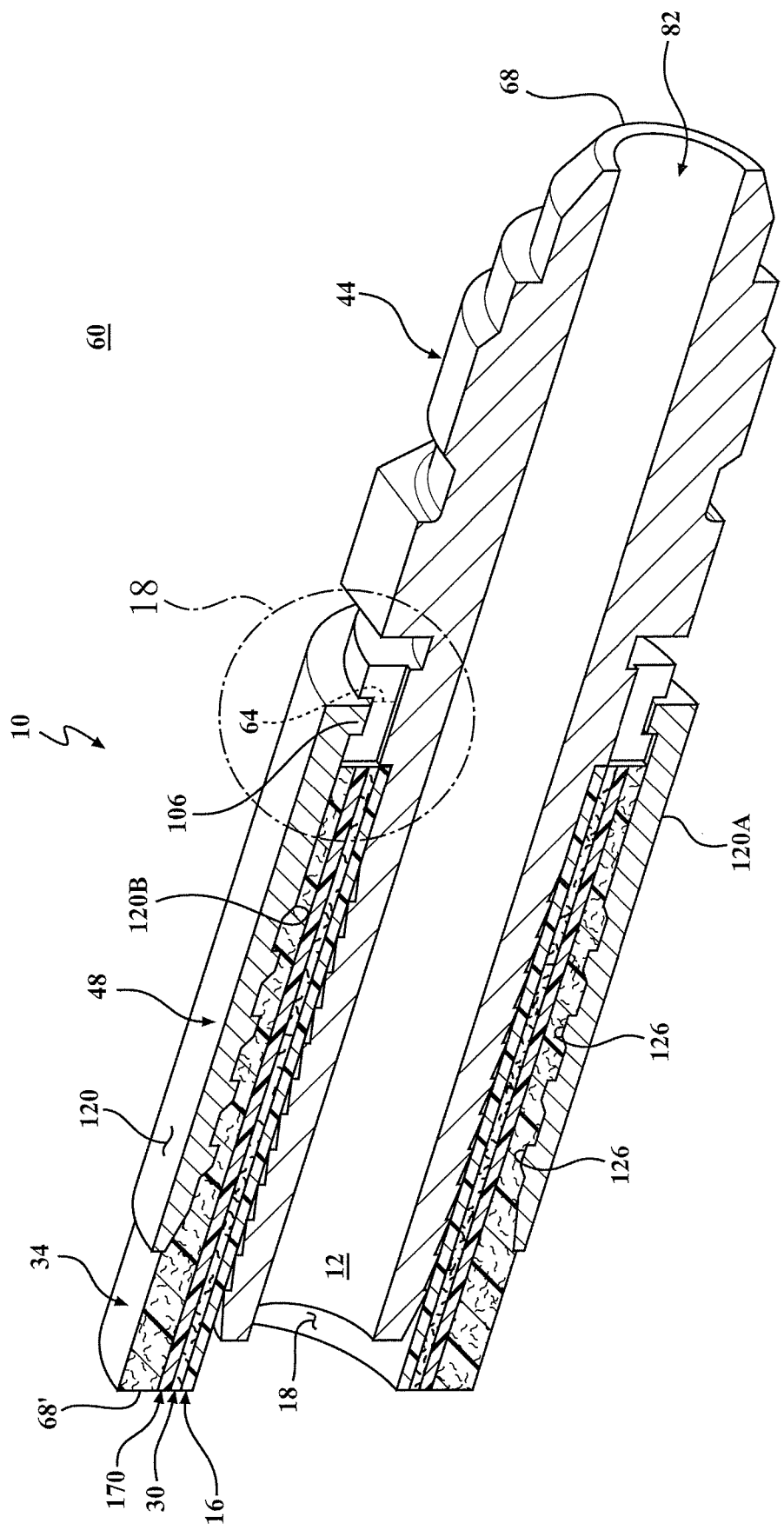
FIG. 9 is a cross-sectional view of another embodiment of the pressure vessel of FIG. 1, illustrating a resin barrier layer between the breather layer and the outer composite shell.

Alternatively, the breather layer 30 can be covered by a resin barrier layer 170 to prevent liquid resin 72 intrusion into the breather layer 30, as illustrated in an embodiment of the pressure vessel 10 shown in FIG. 9.

Figure 10:
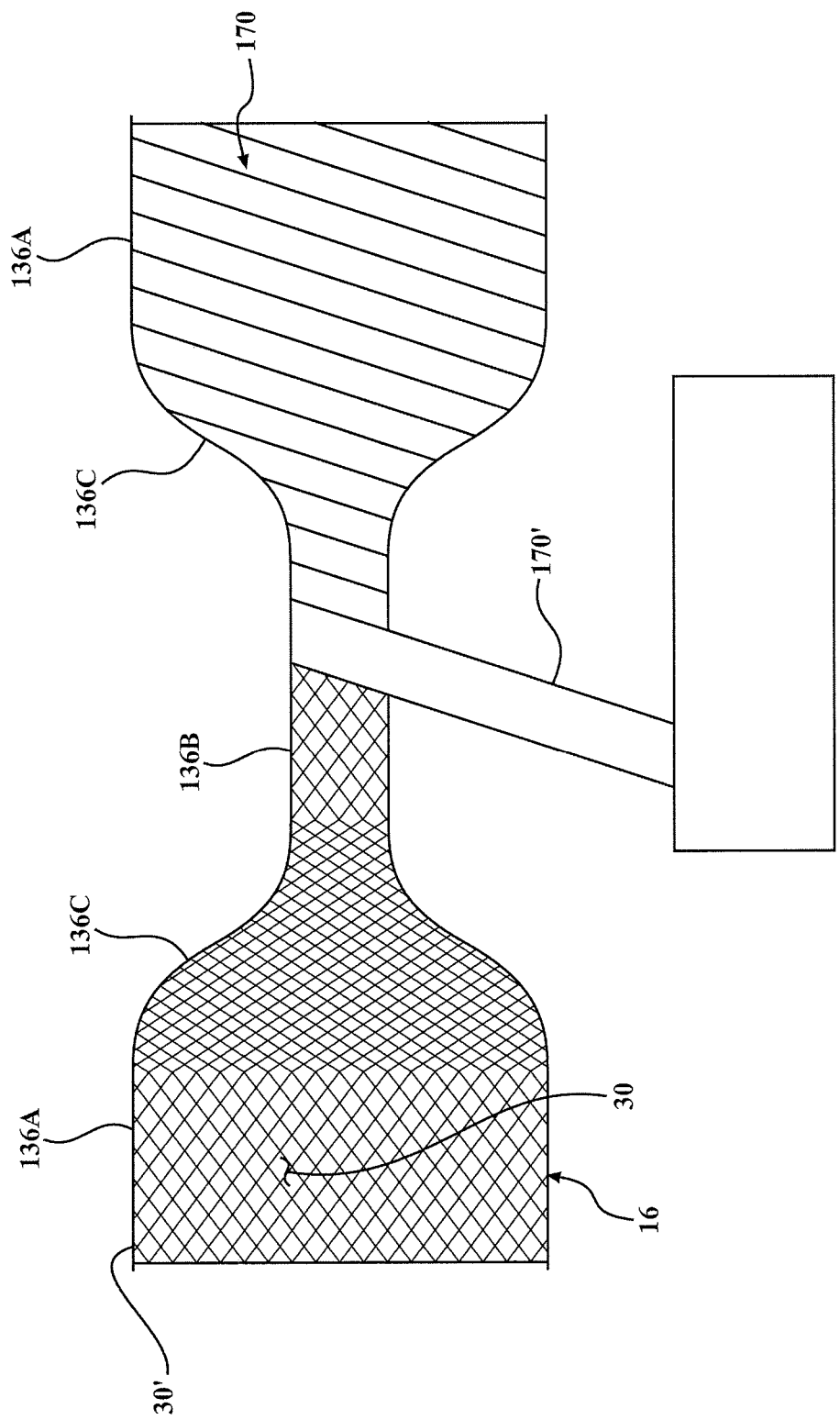
FIG. 10 illustrates a method of wrapping a barrier film around a liner covered in a layer of braided strands of dry fiber.

Preferably, the resin barrier layer 170 comprises a resin barrier material 170' that is liquid impermeable. Suitable resin barrier materials 170' include one or more of linear low-density polyethylene (LLDPE), polysiloxane, polyurethane (PU), polytetrafluoroethylene (PTFE), Nylon, synthetic rubber, silicone, ethylene propylene diene terpolymer (EPDM), polyethylene (DPE), polypropylene (PP), polyvinyl chloride (PVC), acrylonitrile butadiene rubber (Nitrile), ethylene vinyl alcohol (EVOH), polyethylene terephthalate (PET), and the like. The resin barrier material 170' can be a tape, a film, a sheet, a wrap, and/or molded rubber, as non-limiting examples. One preferred embodiment of a resin barrier material 170' is a polymeric film 170' wrapped around an outer periphery 30' of the breather layer 30, as shown in FIG. 10. Wrapping a protective film 170', such as polyethylene stretch wrap, around the outer periphery 30' of the breather layer 30 will prevent liquid resin 72 from clogging the breather layer 30 during the curing process of the resin 72.

Figure 11:
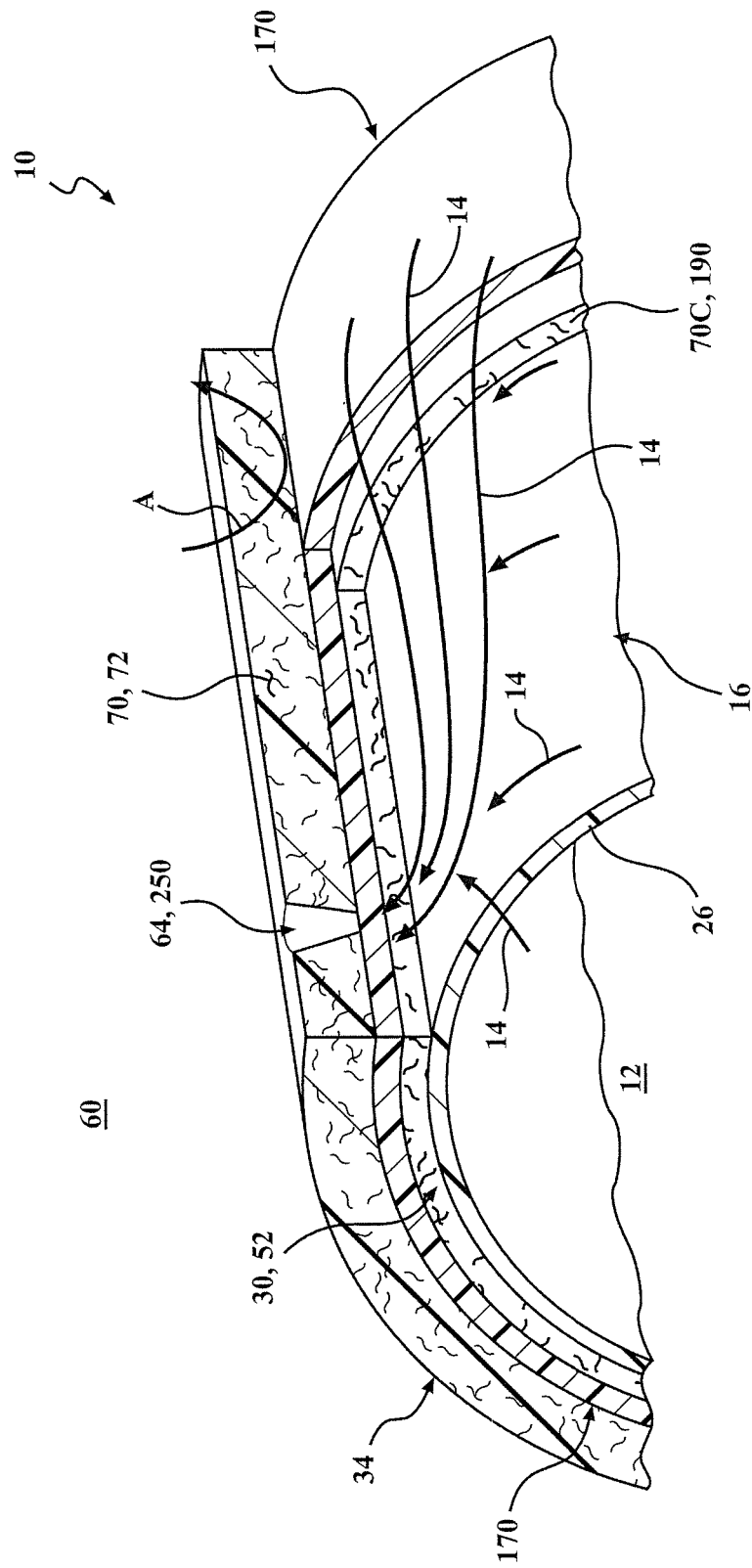
FIG. 11 is an enlarged cutaway view of a portion of the pressure vessel of FIG. 9, illustrating gas flow through the liner, into the breather layer and the resin barrier layer, and through the breather layer and the resin barrier layer, and exhausted through a predetermined exit location to atmosphere.

FIG. 11 shows a cut-away view of the pressure vessel 10 of FIG. 9 illustrating gas 14 permeation through the cylindrical wall 26, into the breather layer 30, and into the resin barrier layer 170. The breather layer 30 is gas permeable and provides a flow path 52 for gas 14 permeating through the cylindrical wall 26. Gas 14 collected by the breather layer 30 is directed towards a predetermined exit location 64 on the pressure vessel 10. In the embodiment shown in FIGS. 9 and 11, the resin barrier layer 170 is liquid impervious, as represented by arrow A, as well as being gas permeable. Thus, liquid resin 72 applied to the fibers 70 forming the outer composite shell 34 will not be absorbed by the breather layer 30 since the resin barrier layer 170 is liquid impervious. Preventing absorption of liquid resin 72 within the breather layer 30, and particularly preventing liquid resin 72 intrusion between the breather layer 30 and the cylindrical wall 26, maintains the gas permeability and porosity of the breather layer 30.

Figure 12A:
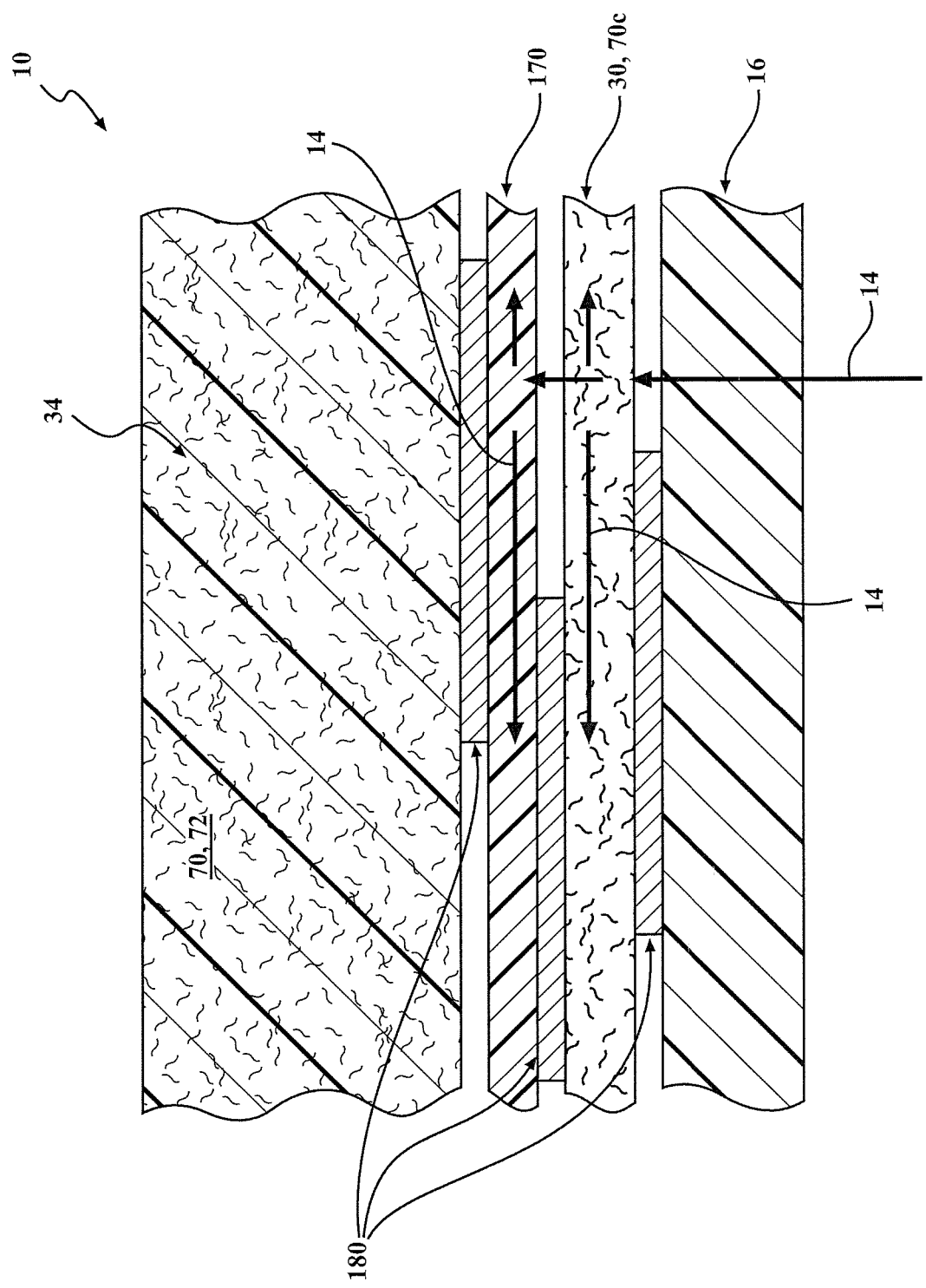
FIG. 12A is an enlarged cross-sectional view of another embodiment of the pressure vessel of FIG. 9, illustrating one or more non-structural metal layers between the inner liner, the breather layer comprising dry fiber, the resin barrier layer, and the outer composite shell.

Alternatively, a non-structural metal layer 180, such as metal foil and/or metalized film, can be used in addition to the resin barrier layer 170 and the breather layer 30. As shown in FIG. 12A, a metal layer 180 can be inserted between the liner 16 and the breather layer 30, between the breather layer 30 and the resin barrier layer 170, and/or between the resin barrier layer 170 and the outer composite shell 34. Further, the non-structural metal layer 180 can be included when the pressure vessel 10 lacks a resin barrier layer 170. Metals have low permeability when compared to polymers. One or several layers of metalized film, such as aluminized Mylar (PET), can be placed around the constant outer diameter (OD) sections of the liner 16 before braiding fiber strands 70C of the breather layer 30 around the liner 16. This significantly slows down the absorption of gas 14, such as hydrogen, by the outer composite shell 34 in the covered areas. This reduces the overall amount of gas 14 absorbed in the outer composite shell 34, therefore mitigating liner 16 collapse. Optionally, metallized Mylar (PET) strips of approximately equal width to the fiber strands 70C and/or carbon fiber rows 70' can be braided around the liner 16 providing the advantage of higher liner 16 coverage and process continuity compared to sheets applied discontinuously only on certain liner 16 sections.

Figure 12B:
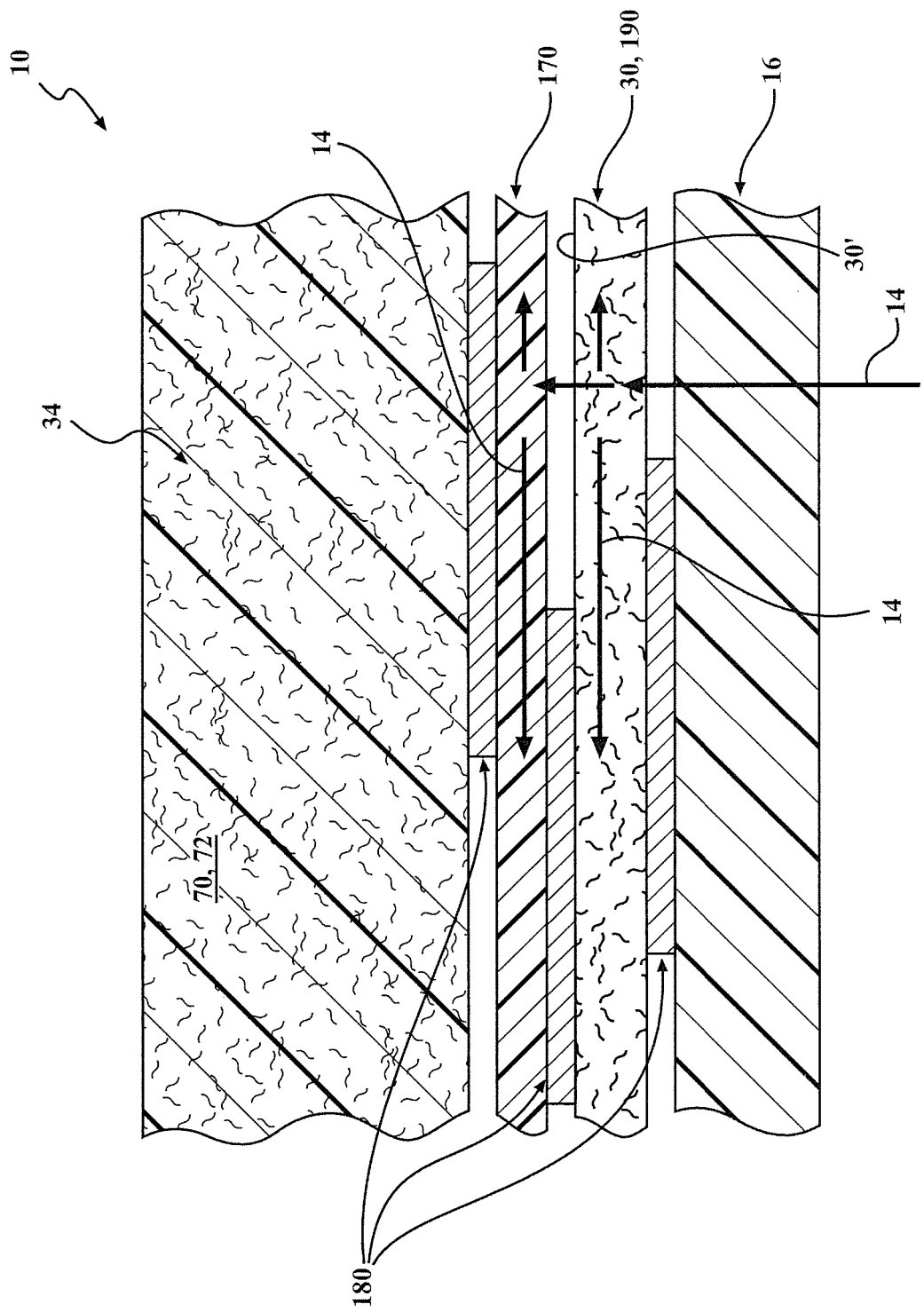
FIG. 12B is an enlarged cross-sectional view of another embodiment of the pressure vessel of FIG. 9, illustrating one or more non-structural metal layers between the inner liner, the breather layer comprising glass fiber fabric, a resin barrier layer, and the outer composite shell.

Another embodiment of the breather layer 30 is shown in FIG. 12B wherein the breather layer 30 is formed of one more layers of wrapped glass fiber cloth 190 in place of the dry fiber 70C layer. The glass fiber cloth 190 can be woven or non-woven. A resin barrier layer 170 of protective film 170', such as polyethylene stretch wrap, is wrapped around an outer periphery 30' of the breather layer 30 to prevent liquid resin 72 from clogging the breather layer 30 during the curing process of the resin 72. Further, one or more non-structural metal layers 180, such as metal foil and/or metalized film, can be inserted between the liner 16 and the breather layer 30, between the breather layer 30 and the resin barrier layer 170, and/or between the resin barrier layer 170 and the outer composite shell 34, as shown in FIG. 12B.

Figure 13:
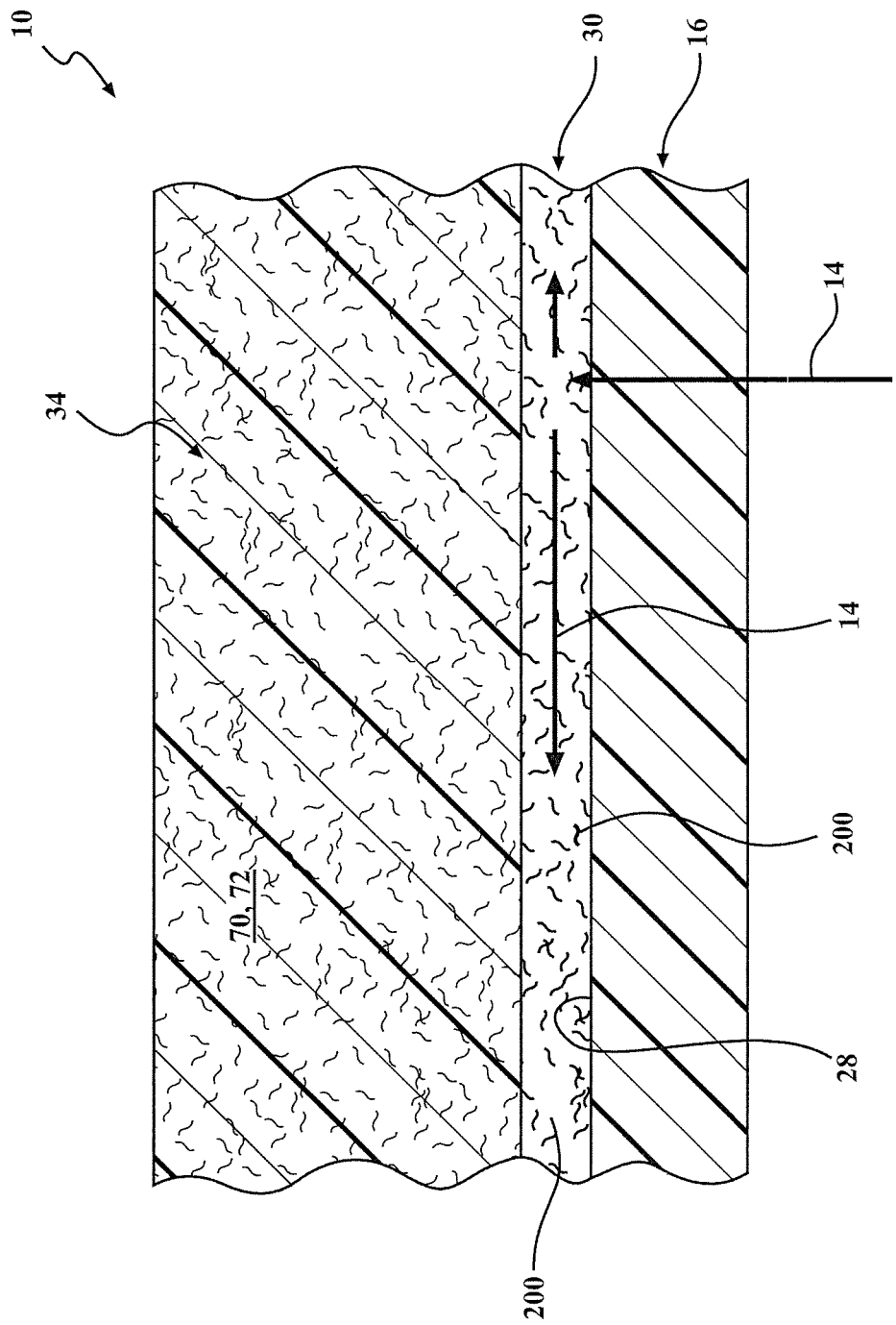
FIG. 13 is an enlarged cross-sectional view of another embodiment of the pressure vessel of FIG. 1, illustrating a breather layer comprising a polymeric film applied to the liner and an outer composite structure applied to the breather layer.
Figure 14:
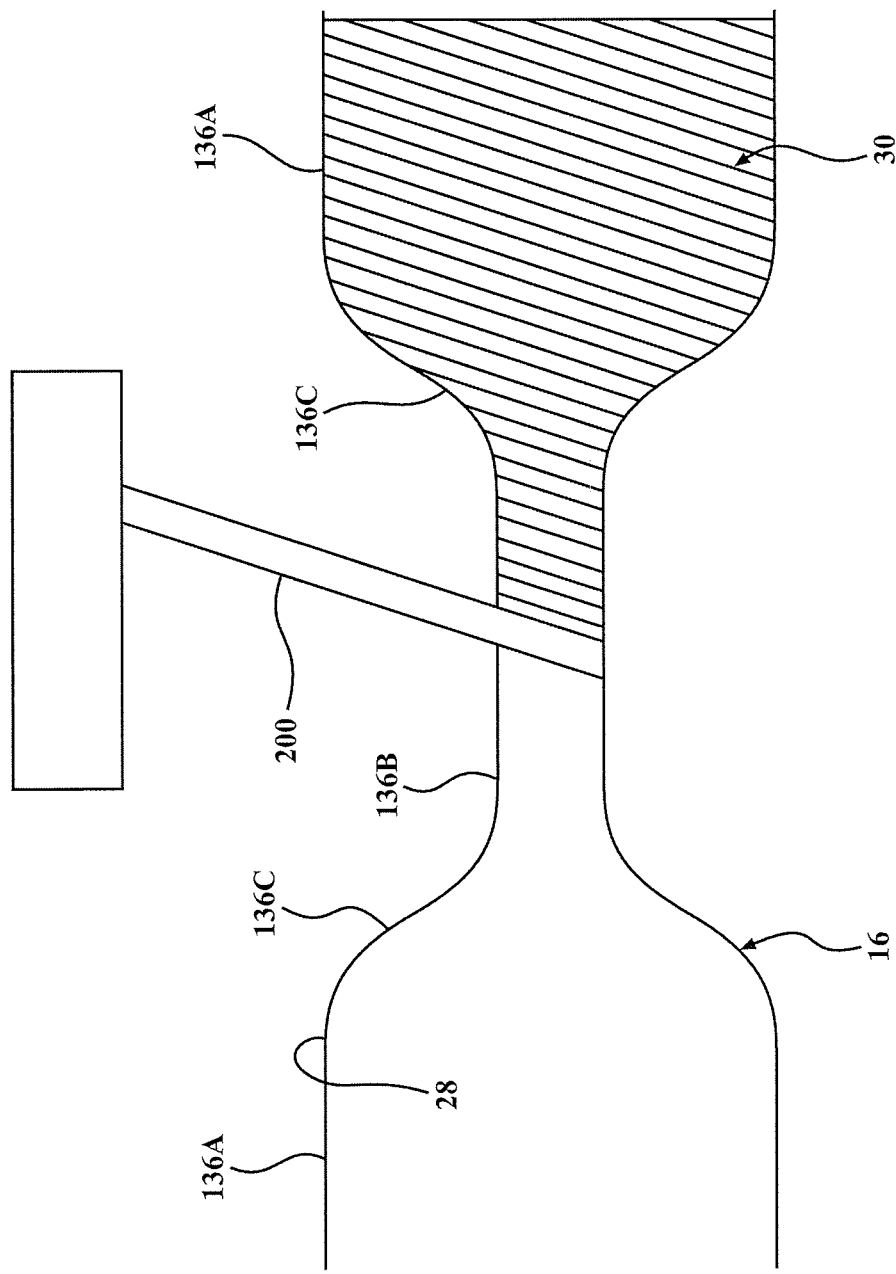
FIG. 14 illustrates a method of wrapping a polymeric film around an outer surface of a liner to form a breather layer.

FIG. 13 shows a cross-sectional view of another embodiment of the pressure vessel 10 of FIG. 1 wherein the breather layer 30 comprises a polymeric film 200. Preferably, the polymeric film 200 is gas permeable as well as liquid impermeable. Thus, the breather layer 30 can collect gas 14 permeating through the liner 16 and direct the gas 14 towards the predetermined exit location 64 on the pressure vessel 10. One preferred embodiment is a polymeric film 200 wrapped around the outer periphery 28 of the liner 16, such as shown in FIG. 14. The polymeric film 200 can be wrapped around constant outer diameter sections 136A, 136B and the tapered sections 136C of the liner 16 for conformable pressure vessels 10.

Suitable polymeric films 200 for the breather layer 30 include one or more of linear low-density polyethylene (LLDPE), polysiloxane, polyurethane (PU), polytetrafluoroethylene (PTFE), Nylon, synthetic rubber, silicone, ethylene propylene diene terpolymer (EPDM), polyethylene (DPE), polypropylene (PP), polyvinyl chloride (PVC), acrylonitrile butadiene rubber (Nitrile), polyethylene terephthalate (PET), and the like. The polymeric film 200 can be a tape, a film, a sheet, a wrap, and/or molded rubber, as non-limiting examples.

Figure 15:
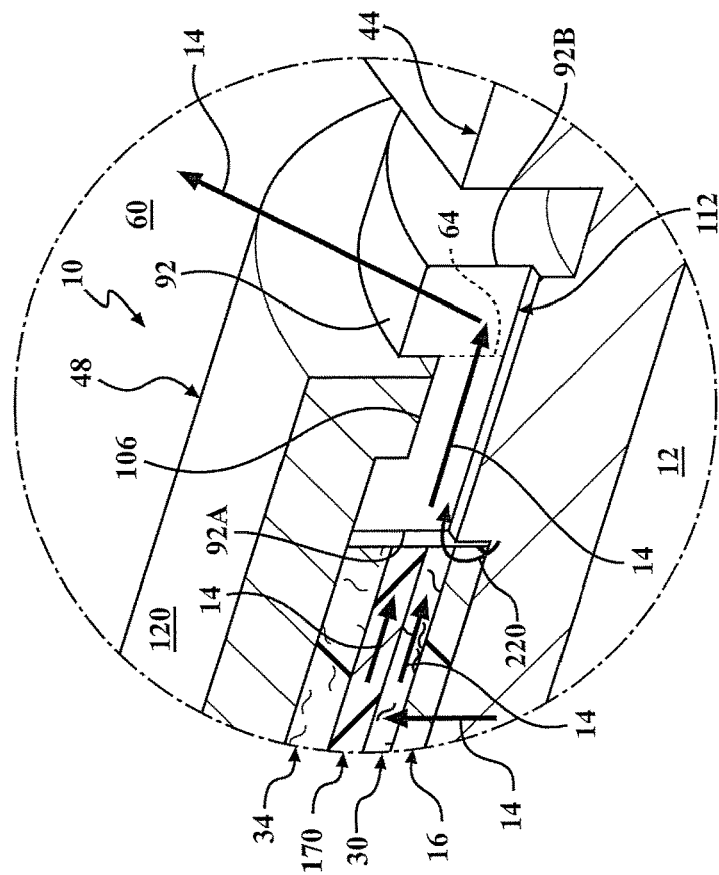
FIG. 15 is an enlarged cross-sectional view of the pressure vessel of FIG. 2, illustrating gas flow along the breather layer, through the vent slot in the stem, and exhausted to an external atmosphere.

Permeate gas 14 collected by the breather layer 30 is vented to the atmosphere 60 through predetermined exit locations 64, such as illustrated in FIG. 15. FIG. 15 shows an enlarged cross-sectional view of portion 17 of the pressure vessel 10 of FIG. 2. The stem 44 includes one or more vent slots 112 extending between the liner mounting surface 92A and the opposing mounting surface 92B of the mounting ridge 92, as shown in FIGS. 3 and 15. When the ferrule 48 is crimped to the outer composite shell 34 and to the mounting ridge 92 of the stem 44, an axial hole 220 is formed in each vent slot 112. Permeate gas 14 collected by the breather layer 30 flows from the breather layer 30, through the axial hole 220 between the ferrule 48 and the mounting ridge 92, and is exhausted to the atmosphere 60. Permeate gas 14 flows from the breather layer 30 into the axial hole 220 when the breather layer 30 comprises dry fiber 70C and when the breather layer 30 comprises a polymer film 200. The amount of gas 14 passing through the axial holes 220 is dependent at least on the gas permeability and porosity of the breather layer 30 as well as the overall liner 16 length.

Figure 16:
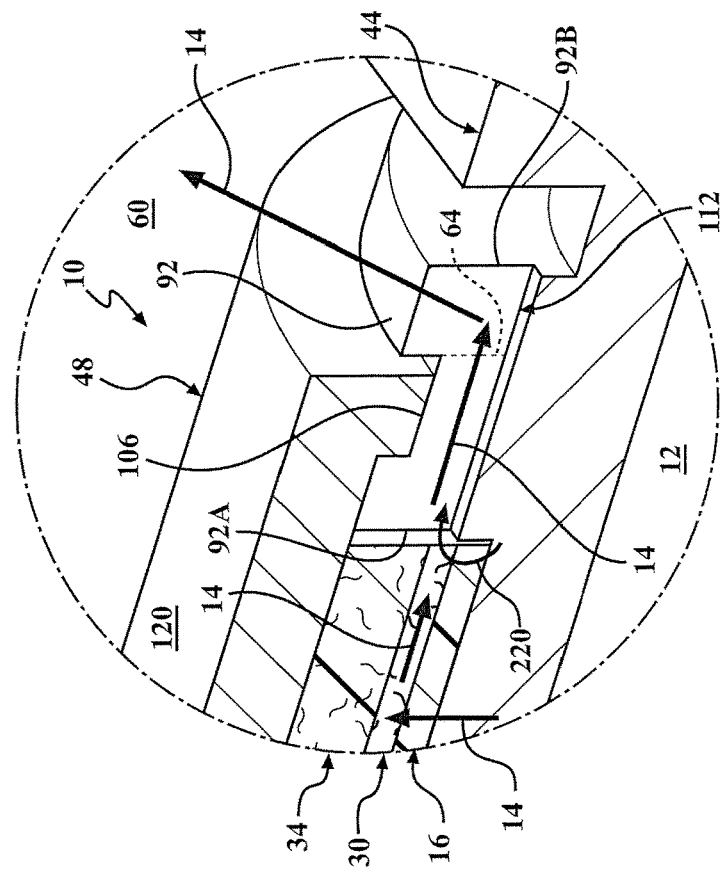
FIG. 16 is an enlarged cross-sectional view of the pressure vessel of FIG. 9, illustrating gas flow along the breather layer and along the resin barrier layer, through the vent slot in the stem, and exhausted to an external atmosphere.

FIG. 16 illustrates the flow of permeate gas 14 through the axial hole 220 when the liner 16 is covered by a breather layer 30 and a resin barrier layer 170. Since both the breather layer 30 and the resin barrier layer 170 are gas permeable, gas 14 flows from both the breather layer 30 and the resin barrier layer 170 into the axial hole 220 through the mounting ridge 92 and exhausted to the atmosphere 60.

Figure 17:
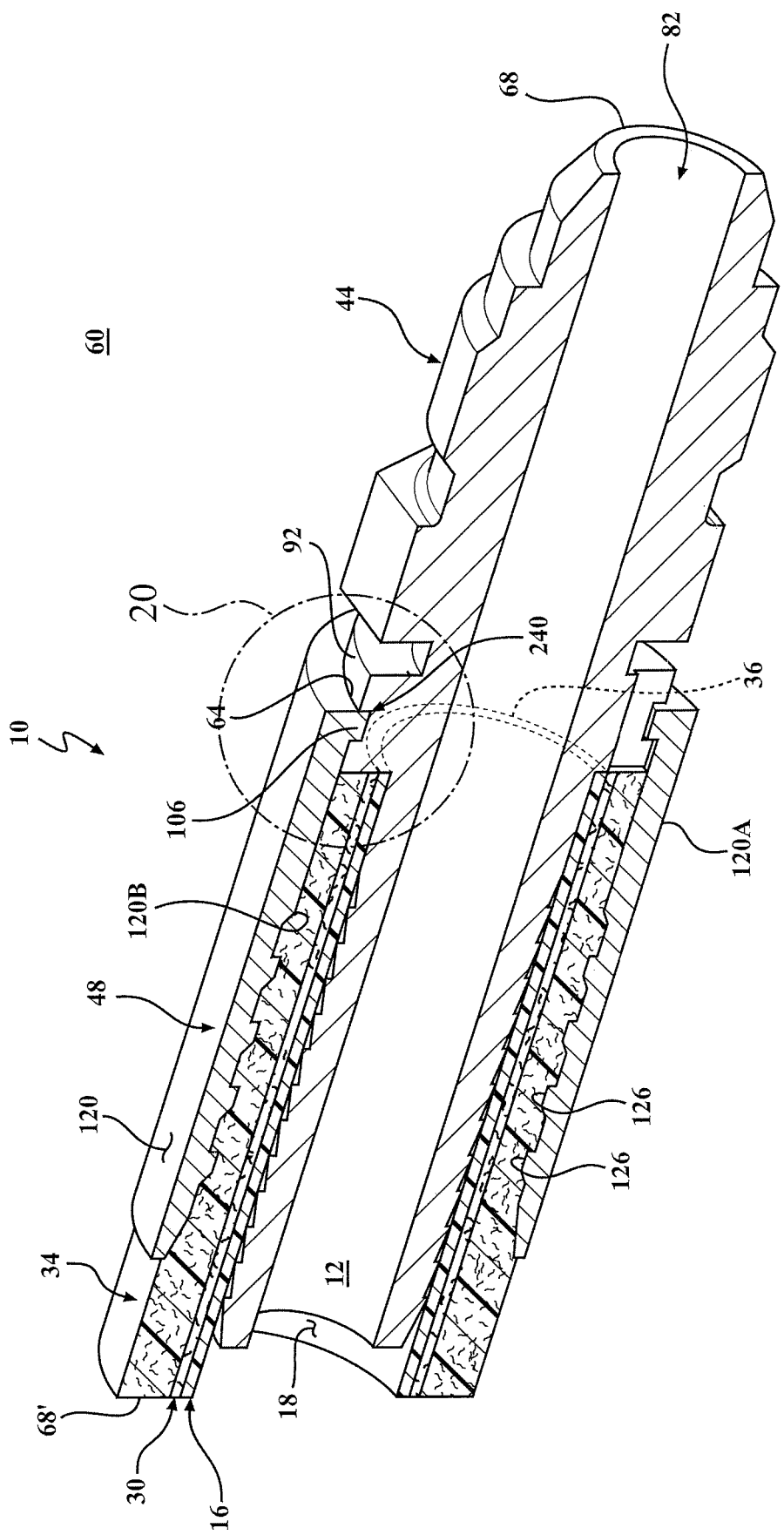
FIG. 17 is a cross-sectional view of a portion of a pressure vessel having breather layer between a polymeric liner and an outer composite shell, a stem inserted into an opening in the liner, and a ferrule fixedly coupling the stem to the outer composite shell, according to another embodiment of the present invention.
Figure 18:
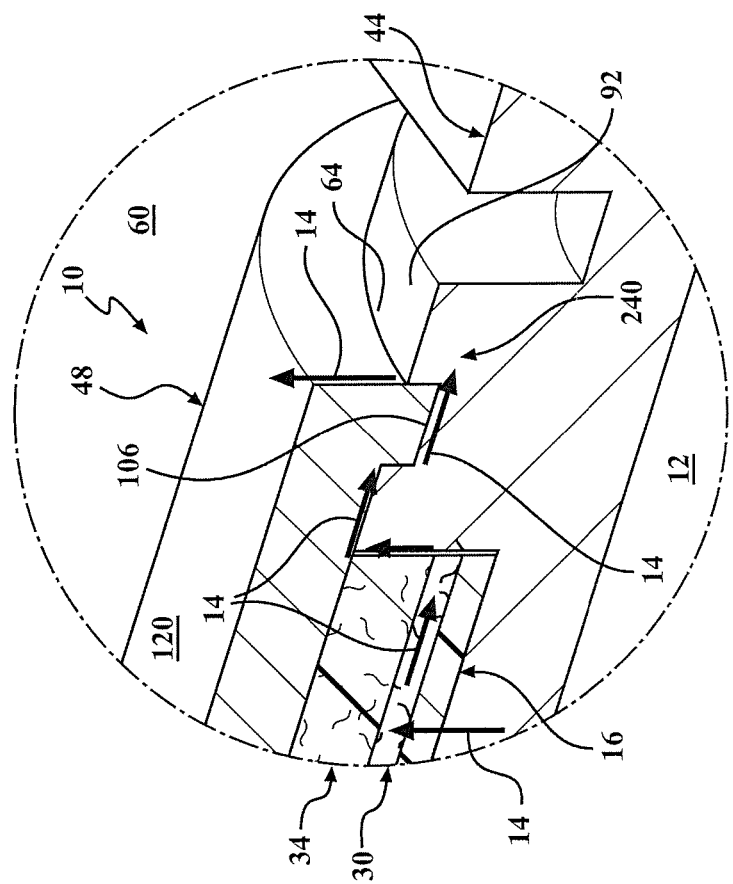
FIG. 18 is an enlarged cross-sectional view of the pressure vessel of FIG. 17, illustrating gas flow along the breather layer, through a crimp joint between the stem and the ferrule, and exhausted to an external atmosphere.

A second embodiment of venting the breather layer 30 to atmosphere 60 is shown in FIGS. 17 and 18, wherein the permeate gas 14 passes through a crimp joint 240 between the ferrule 48 and the stem 44. FIG. 17 illustrates a pressure vessel 10 having a breather layer 30 between the liner 16 and the outer composite 34. The pressure vessel 10 of FIG. 17 includes a stem 44 inserted into an opening 36 in the liner 16 and a ferrule 48 fixedly coupling the outer composite shell 34 to the stem 44. However, the stem 44 of FIG. 17 lacks vent slots 112 in the mounting ridge 92 shown in FIG. 2. The crimp joint 240 of the ferrule 48 is configured to convey gas 14 under the ferrule 48 and out to the atmosphere 60. Permeate gas 14 flows from the breather layer 30, through the crimp joint 240 between the ferrule 48 and the stem 44, and out to the atmosphere 60, as illustrated in FIG. 18.

Figure 19:
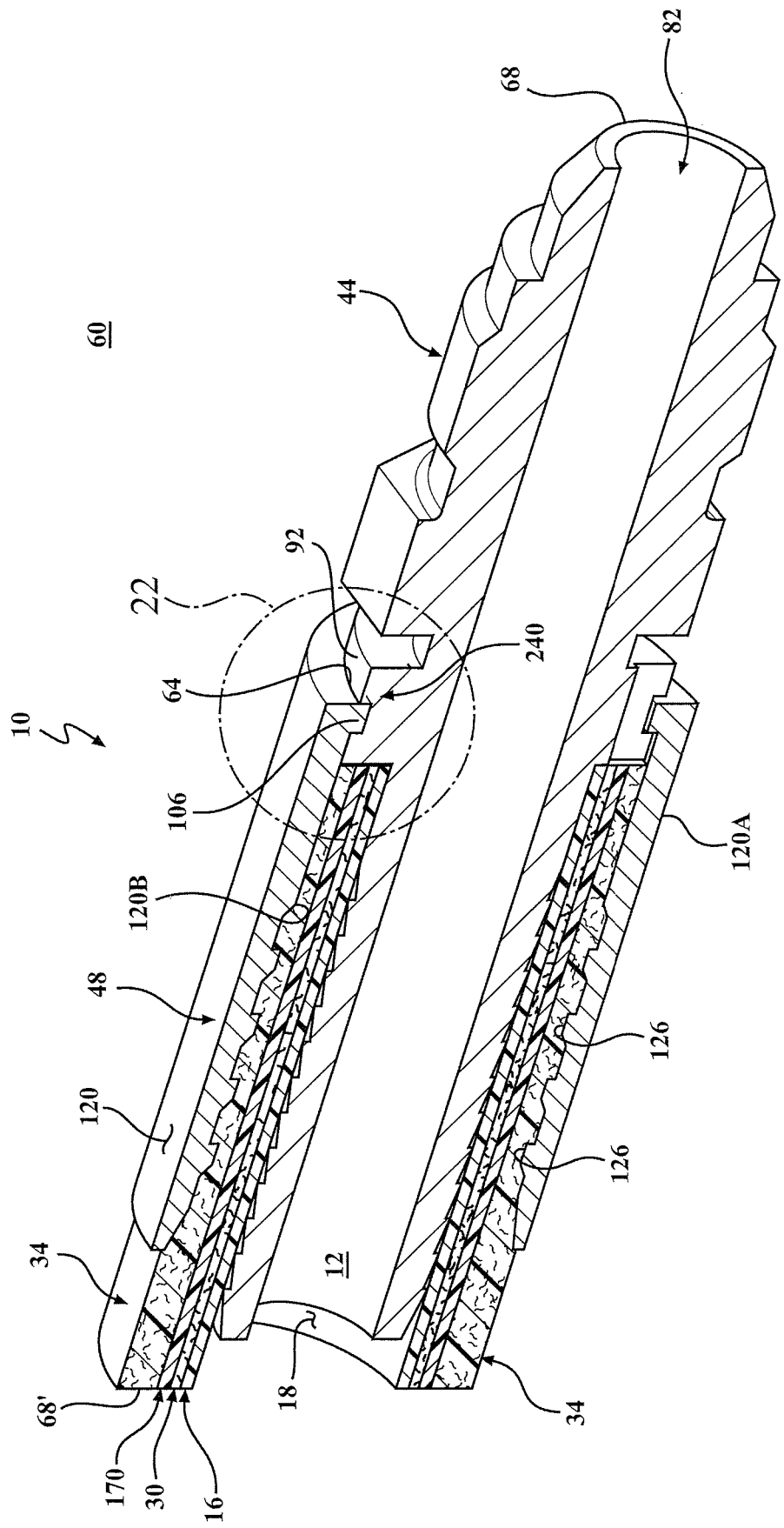
FIG. 19 is a cross-sectional view of another embodiment of the pressure vessel of FIG. 17, illustrating a resin barrier layer between the breather layer and the outer composite shell.
Figure 20:
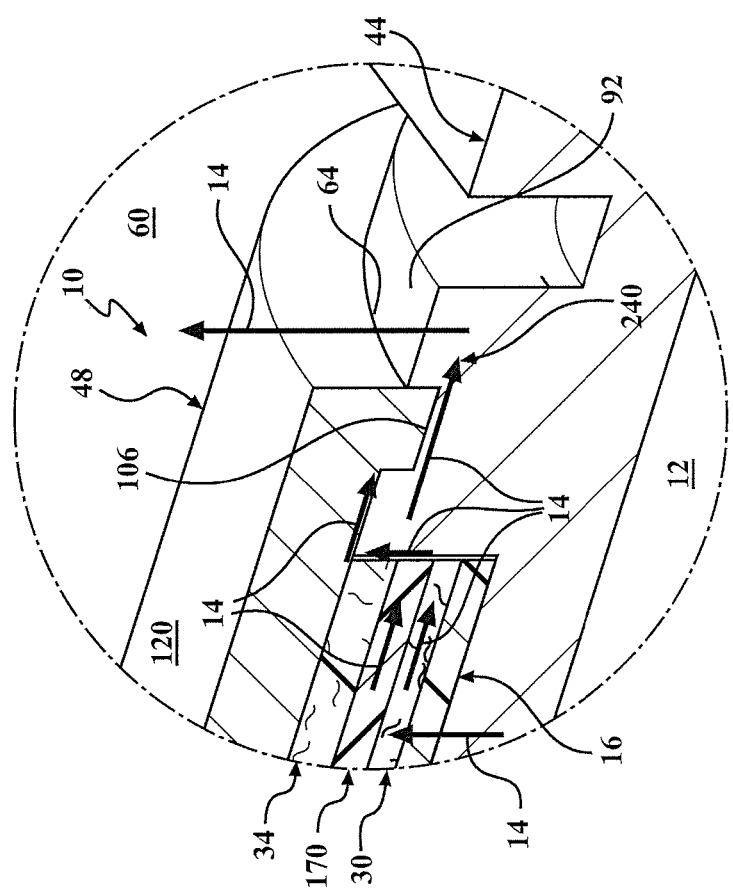
FIG. 20 is an enlarged cross-sectional view of the pressure vessel of FIG. 19, illustrating gas flow along the breather layer and the resin barrier layer, through a crimp joint between the stem and the ferrule, and exhausted to an external atmosphere.

FIG. 19 illustrates an embodiment of a pressure vessel 10 having a breather layer 30 and a resin barrier layer 170 between the liner 16 and the outer composite shell 34, as well as having the stem 44 and ferrule 48 shown in FIG. 17. Permeate gas 14 flowing along the breather layer 30 and the resin barrier layer 170 passes through the crimp joint 240 between the ferrule 48 and the stem 44, and out to the atmosphere 60, as illustrated in FIG. 20.

Figure 21:
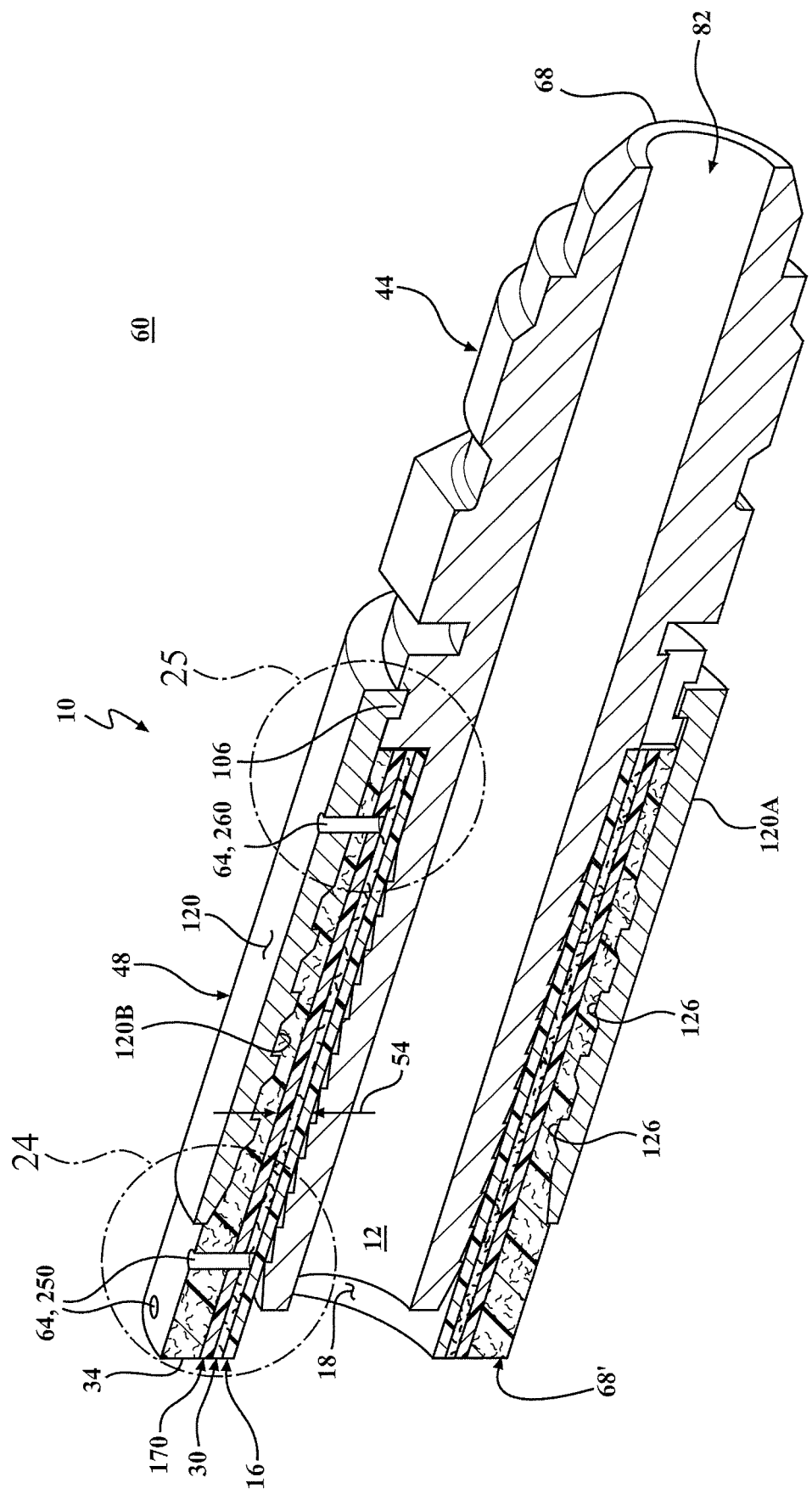
FIG. 21 is a cross-sectional view of another embodiment of the pressure vessel of FIG. 17, illustrating venting holes through the outer composite shell fluidically coupling the breather layer to an external atmosphere.

Another way of mitigating the gas pressure increase in the gap 54 between the liner 16 and the outer composite shell 34, and therefore preventing a subsequent collapse of the liner 16, is to provide venting holes 250, 260 through the outer composite shell 34, as shown in FIG. 21. The one or more venting holes 250, 260 fluidically connect the breather layer 30 through the outer composite shell 34 to the atmosphere 60.

The pressure vessel 10 can include one or more venting holes 250, 260 in the outer composite shell 34 near a terminal end 68 of the pressure vessel 10. Optionally, the pressure vessel 10 can include an array of venting holes 250 distributed along the entirety of the pressure vessel 10 and/or along selected longitudinal sections of the pressure vessel 10. An array of venting holes 250 in the outer composite shell 34 can be created by inserting needles into the outer composite shell 34 after braiding, but before curing of the resin 72. The needles are removed from the outer composite shell 34 after the resin 72 is cured. The diameter, number, and position of the venting holes 250, 260 are selected based on the amount of venting required to mitigate the gas pressure in the gap 54 between the liner 16 and the outer composite shell 34.

Figure 22:
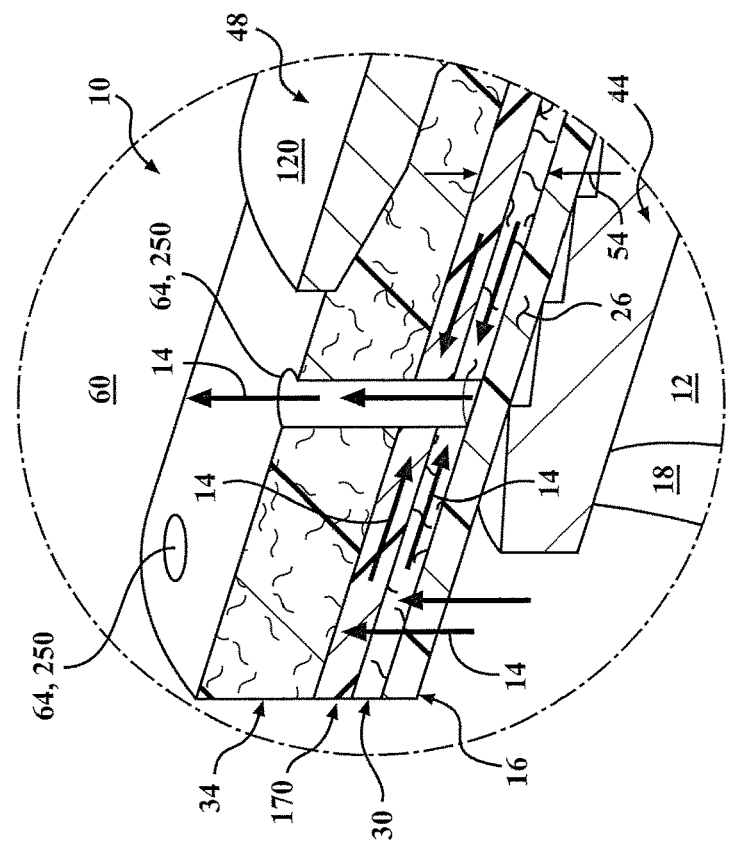
FIG. 22 is an enlarged cross-sectional view of a portion of the pressure vessel of FIG. 21, illustrating gas flow along the breather layer and the resin barrier layer, through a venting hole in the outer composite shell, and exhausted to an external atmosphere.

FIG. 22 illustrates the flow of gas 14 from an interior space 18 of the liner 16, through the liner wall 26, into the breather layer 30, through the venting holes 250 in the outer composite shell 34, and exhausted to the atmosphere 60. Permeate gas 14 also flows along the optional resin barrier layer 170 to the venting holes 250 if the resin barrier layer 170 is gas permeable. An array of venting holes 250 in the outer composite shell 34 may provide sufficient mitigation of gas pressure in the gap 54 between the liner 16 and the outer composite shell 34 such that a breather layer 30 is not required. In this case, the array of venting holes 250 drains gas 14 from the gap 54 between the liner 16 and the outer composite shell 34. The diameter, spacing, and number of the venting holes 250, 260 through the outer composite shell 34 is selected based in part on the amount of gas 14 that is to be vented to the atmosphere 60.

Figure 23:
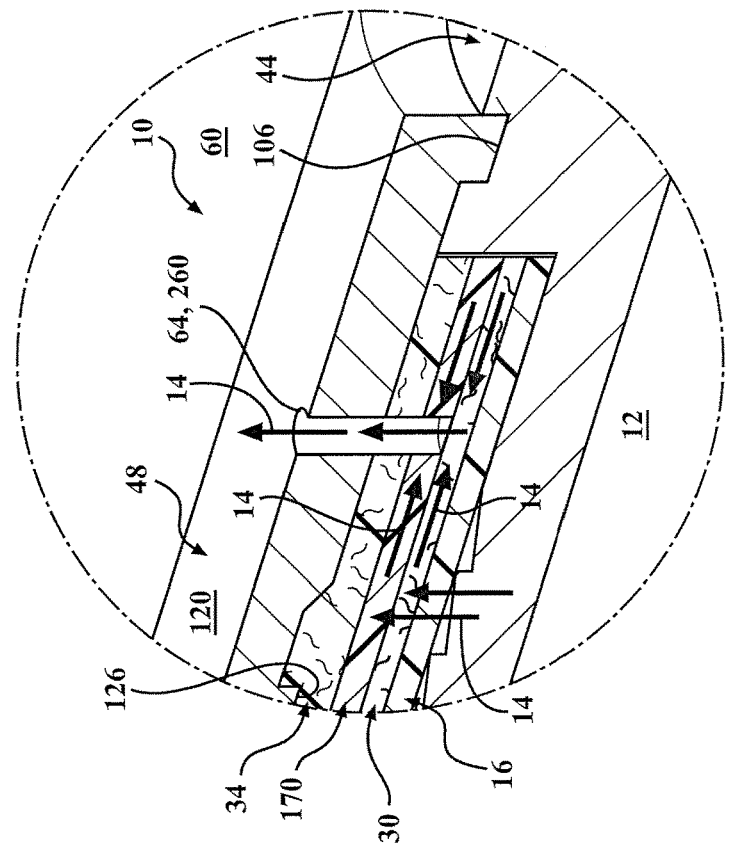
FIG. 23 is an enlarged cross-sectional view of a portion of the pressure vessel of FIG. 21, illustrating gas flow along the breather layer and the resin barrier layer, through a venting hole extending through the outer composite shell and the ferrule, and exhausted to an external atmosphere.

Gas 14 is similarly exhausted to atmosphere 60 when the venting holes 260 pass through both the outer composite shell 34 and the ferrule 48, as shown in FIGS. 21 and 23. Referring to FIGS. 21 and 23, one or more venting holes 260 may extend through the ferrule 48 and through the outer composite shell 34 to the breather layer 30. To prevent interference with the sealing and mechanical grip features 126 of the crimped ferrule 48, the one or more drilled venting holes 260 would be located beyond these features 126 near the terminal end 68 of the pressure vessel 10. This way, the abilities of the ferrule 48 to contain gas 14 and secure the outer composite shell 34 to the stem 44 are not affected by the one or more venting holes 260 through the ferrule 48. Additionally, the ferrule 48 is designed such that the presence of the venting hole(s) 260 does not degrade its structural integrity to an unacceptable extent. The breather layer 30 must continue to operate as expected under the pressure of the crimped ferrule 48, i.e., air channels 52, 148 in the breather layer 30 to convey gas 14 must remain open. If the ability of the breather layer 30 to maintain porosity under crimp pressure is of concern, additional porous material (such as sintered metal inserts, more fibers, glass beads) may be installed between the liner 16 and the outer composite shell 34 to ensure gas 14 flow.

One benefit of a pressure vessel 10 having improved porosity of a breather layer 30 over the porosity of a helically wrapped dry fiber layer of the same fiber as used for the outer composite shell 34 is improved permeate gas 14 management. A second benefit is a breather layer 30 that can be disposed onto a liner 16 having larger outer diameter sections 136A spaced apart by smaller diameter sections 136B as in certain conformable pressure vessels 10. A third benefit is preservation of the porosity of the breather layer 30 by preventing intrusion of liquid resin 72 into the breather layer 30 and preventing intrusion of liquid resin 72 between the breather layer 30 and the liner 16. A fourth benefit is a breather layer 30 that is both gas permeable and liquid impermeable such that the breather layer 30 prevents resin 72 intrusion between the breather layer 30 and the liner 16 while also allowing gas 14 permeation along the breather layer 30 to a predetermined exit location 64 on the pressure vessel 10.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A pressure vessel for containing liquids and/or gases under pressure, said pressure vessel comprising:
    a polymeric liner comprising a hollow body defined by an elongated cylindrical wall having an outer surface extending between a first terminal end and a second terminal end of said liner;
    a breather layer surrounding said outer surface of said cylindrical wall and extending between said first terminal end and said second terminal end of said liner, said breather layer being gas permeable and impermeable to liquids, said breather layer providing a flow passageway for gas permeating through said cylindrical wall collected by said breather layer; and
    an outer composite shell comprising resin and fibers of a first fiber type, said outer composite shell surrounding an outer periphery of said breather layer and extending between said first terminal end and said second terminal end of said liner;
    said liner including an inlet opening near said first terminal end of said liner;
    said pressure vessel including a stem and a ferrule;
    said stem having a cylindrical boss extending in a longitudinal direction and configured to be inserted into said inlet opening of said liner, said stem including a mounting ridge projecting from said cylindrical boss and extending circumferentially around an outer periphery of said stem;
    said stem being inserted into said inlet opening of said liner such that said inlet opening of said liner circumferentially surrounds said cylindrical boss adjacent said mounting ridge; and
    said ferrule fixedly coupling said mounting ridge to said outer composite shell;
    wherein said gas permeating through said cylindrical wall collected by said breather layer is directed to a predetermined exit location on said pressure vessel.

2. The pressure vessel as set forth in claim 1, wherein:
    said first fiber type comprising one or more of carbon fiber, glass fiber, basalt fiber, boron fiber, aramid fiber, high-density polyethylene fiber (HDPE), polyethylene naphthalate (PEN), Zylon™ poly(p-phenylene-2,6-benzobisoxazole fiber (PBO), aramid fiber, Kevlar® poly-paraphenylene terephthalamide fiber, polyethylene terephthalate fiber (PET), Nylon fiber (PA), polyester fiber (PL), polypropylene fiber (PP), and/or polyethylene fiber (PE);
    said polymeric liner comprising one or more of Nylon (PA), ethylene-vinyl acetate (EVA), linear low-density polyethylene (LLDPE), low-density polyethylene (LDPE), high-density polyethylene (HDPE), polypropylene (PP), ethylene vinyl alcohol (EVOH), polytetrafluoroethylene (PTFE), polyurethane (PU), and/or polyvinyl chloride (PVC); and
    said resin comprises one or more of an epoxy resin, a thermoplastic resin, a vinylester resin, a polyester resin, and/or urethane.

3. The pressure vessel as set forth in claim 2, wherein:
    said breather layer comprises one or more of linear low-density polyethylene (LLDPE), polysiloxane, polyurethane (PU), polytetrafluoroethylene (PTFE), Nylon, synthetic rubber, silicone, ethylene propylene diene terpolymer (EPDM), polyethylene (DPE), polypropylene (PP), polyvinyl chloride (PVC), acrylonitrile butadiene rubber (Nitrile), and/or polyethylene terephthalate (PET).

4. The pressure vessel as set forth in claim 3, wherein said breather layer is one or more of a tape, a film, a sheet, a wrap, and/or molded rubber.

5. The pressure vessel as set forth in claim 4, wherein:
    said breather layer includes one or more of glass fiber woven fabric and/or glass fiber non-woven fabric wrapped around said outer periphery of said cylindrical wall.

6. The pressure vessel as set forth in claim 2, wherein:
    said breather layer includes one or more stacked braided fiber layers of a second fiber type;

said second fiber type comprising one or more of carbon fiber, glass fiber, basalt fiber, boron fiber, aramid fiber, high-density polyethylene fiber (HDPE), polyethylene naphthalate (PEN), Zylon™ poly(p-phenylene-2,6-benzobisoxazole fiber (PBO), aramid fiber, Kevlar® poly-paraphenylene terephthalamide fiber, polyethylene terephthalate fiber (PET), Nylon fiber (PA), polyester fiber (PL), polypropylene fiber (PP), and/or polyethylene fiber (PE); and said second fiber type being different than said first fiber type in one or more of material composition and/or fiber outer diameter.

7. The pressure vessel as set forth in claim 6, wherein said fibers of said second fiber type have a larger outer diameter than an outer diameter of said fibers of said first fiber type.

8. The pressure vessel as set forth in claim 2, wherein:

said pressure vessel includes at least one non-structural metal film layer surrounding said outer periphery of said cylindrical wall and extending longitudinally along at least a portion of said cylindrical wall;

said at least one non-structural metal film layer being in direct contact with one or more of said cylindrical wall, said breather layer, and/or said outer composite shell; and said at least one non-structural metal film layer comprising one or more of a metalized film and/or a metal foil.

9. The pressure vessel as set forth in claim 2, wherein:

said outer composite shell includes at least one venting hole extending through said outer composite shell; and said at least one venting hole fluidically connecting said breather layer to an external atmosphere such that gas permeating into said breather layer flows through said breather layer into said at least one venting hole, flows through said at least one venting hole, and disperses into said external atmosphere.

10. The pressure vessel as set forth in claim 1, wherein:

said mounting ridge including a liner mounting surface orientated towards said liner and an opposing mounting surface oriented away from said liner when said stem is assembled with said liner;

said mounting ridge including a vent slot extending between said liner mounting surface and said opposing mounting surface; and said vent slot fluidically coupling said breather layer to an external atmosphere such that gas permeating into said breather layer flows through said breather layer into said vent slot, flows through said vent slot, and disperses into said external atmosphere.

11. The pressure vessel as set forth in claim 10, wherein:

crimping said ferrule to said mounting ridge of said stem forms an axial hole through said vent slot; and said gas flowing through said vent slot passes through said axial hole.

12. The pressure vessel as set forth in claim 1, wherein:

at least one venting hole extends through said ferrule and said outer composite shell; and said at least one venting hole fluidically connecting said breather layer to an external atmosphere such that gas permeating into said breather layer flows through said breather layer into said at least one venting hole, flows through said at least one venting hole, and disperses into said external atmosphere.

13. A pressure vessel for containing liquids and/or gases under pressure, said pressure vessel comprising:

a polymeric liner comprising a hollow body defined by an elongated cylindrical wall having an outer surface extending between a first terminal end and a second terminal end of said liner;

a breather layer surrounding said outer surface of said cylindrical wall and extending between said first terminal end and said second terminal end of said liner, said breather layer formed by braiding fibers of a first fiber type around said cylindrical wall, said breather layer providing a flow passageway for gas permeating through said cylindrical wall collected by said breather layer, and said breather layer being free of resin; and an outer composite shell comprising resin and fibers of a second fiber type, said outer composite shell surrounding an outer periphery of said breather layer and extending between said first terminal end and said second terminal end of said liner;

wherein said first fiber type is different from said second fiber type in one or more of material composition and/or fiber outer diameter;

said liner including an inlet opening near said first terminal end of said liner;

said pressure vessel including a stem and a ferrule;

said stem having a cylindrical boss extending in a longitudinal direction and configured to be inserted into said inlet opening of said liner, said stem including a mounting ridge projecting from said cylindrical boss and extending circumferentially around said stem;

said stem being inserted into said inlet opening of said liner such that said inlet opening of said liner circumferentially surrounds said cylindrical boss adjacent said mounting ridge; and said ferrule fixedly coupling said mounting ridge to said outer composite shell;

wherein said gas permeating through said cylindrical wall collected by said breather layer is directed to a predetermined exit location on said pressure vessel.

14. The pressure vessel as set forth in claim 13, wherein:

each of said first fiber type and said second fiber type comprising one or more of carbon fiber, glass fiber, basalt fiber, boron fiber, aramid fiber, high-density polyethylene fiber (HDPE), polyethylene naphthalate (PEN), Zylon™ poly(p-phenylene-2,6-benzobisoxazole fiber (PBO), aramid fiber, Kevlar® poly-paraphenylene terephthalamide fiber, polyethylene terephthalate fiber (PET), Nylon fiber (PA), polyester fiber (PL), polypropylene fiber (PP), and/or polyethylene fiber (PE);

said polymeric liner comprising one or more of Nylon (PA), ethylene-vinyl acetate (EVA), linear low-density polyethylene (LLDPE), low-density polyethylene (LDPE), high-density polyethylene (HDPE), polypropylene (PP), ethylene vinyl alcohol (EVOH), polytetrafluoroethylene (PTFE), polyurethane (PU), and/or polyvinyl chloride (PVC); and said resin comprises one or more of an epoxy resin, a thermoplastic resin, a vinylester resin, a polyester resin, and/or urethane.

15. The pressure vessel as set forth in claim 14, wherein said first fiber type having fibers with a first outer diameter, said second fiber type having fibers with a second outer diameter, and said first outer diameter being larger than said second outer diameter.

16. The pressure vessel as set forth in claim 14, wherein:
said pressure vessel includes a resin barrier layer surrounding an outer periphery of said outer surface of said cylindrical wall and/or an outer surface of said breather layer;
said resin barrier layer being gas permeable and liquid impermeable; and
said resin barrier layer comprises one or more of linear low-density polyethylene (LLDPE), polysiloxane, polyurethane (PU), polytetrafluoroethylene (PTFE), Nylon, synthetic rubber, silicone, ethylene propylene diene terpolymer (EPDM), polyethylene (DPE), polypropylene (PP), polyvinyl chloride (PVC), acrylonitrile butadiene rubber (Nitrile), ethylene vinyl alcohol (EVOH), and/or polyethylene terephthalate (PET).

17. The pressure vessel as set forth in claim 16, wherein said resin barrier layer is one or more of a tape, a film, a sheet, a wrap, and/or molded rubber.

18. The pressure vessel as set forth in claim 14, wherein:
said pressure vessel includes at least one non-structural metal film layer surrounding said outer periphery of said cylindrical wall and extending longitudinally along at least a portion of said cylindrical wall;
said at least one non-structural metal film layer being in direct contact with one or more of said outer surface of said cylindrical wall, said breather layer, and/or an inner surface of said outer composite shell; and
said at least one non-structural metal film layer comprising one or more of a metalized film and/or a metal foil.

19. The pressure vessel as set forth in claim 14, wherein:
said outer composite shell includes at least one venting hole extending through said outer composite shell; and
said at least one venting hole fluidically connecting said breather layer to an external atmosphere such that gas permeating into said breather layer flows through said breather layer into said at least one venting hole, flows through said at least one venting hole, and disperses into said external atmosphere.

20. The pressure vessel as set forth in claim 13, wherein:
said mounting ridge including a liner mounting surface orientated towards said liner and an opposing mounting surface oriented away from said liner when said stem is assembled with said liner;
said mounting ridge including a vent slot extending between said liner mounting surface and said opposing mounting surface; and
said vent slot fluidically coupling said breather layer to an external atmosphere such that gas permeating into said breather layer flows through said breather layer into said vent slot, flows through said vent slot, and disperses into said external atmosphere.

21. The pressure vessel as set forth in claim 13, wherein:
at least one venting hole extends through said ferrule and said outer composite shell; and
said at least one venting hole fluidically connecting said breather layer to an external atmosphere such that gas permeating into said breather layer flows through said breather layer into said at least one venting hole, flows through said at least one venting hole, and disperses into said external atmosphere.

22. The pressure vessel as set forth in claim 13, wherein:
at least one venting hole extends through said outer composite shell; and
said at least one venting hole fluidically connecting said breather layer to an external atmosphere such that gas permeating into said breather layer flows through said breather layer into said at least one venting hole, flows through said at least one venting hole, and disperses into said external atmosphere.

* * * * *